United States Patent [19]

Akahori et al.

[11] Patent Number: 5,112,971
[45] Date of Patent: May 12, 1992

[54] ANTHRAQUINONE DYE COMPOUNDS HAVING FIBERS REACTIVE GROUP

[75] Inventors: Kingo Akahori, Toyonaka; Naoki Harada, Suita; Yutaka Kayane, Ibaraki; Takashi Omura, Kobe, all of Japan

[73] Assignee: Sumitomo Chemical Company, Limited, Osaka, Japan

[21] Appl. No.: 386,699

[22] Filed: Jul. 31, 1989

[30] Foreign Application Priority Data

Aug. 10, 1988 [JP] Japan .................. 63-200793
Sep. 1, 1988 [JP] Japan .................. 63-219516
Sep. 2, 1988 [JP] Japan .................. 63-220844

[51] Int. Cl.$^5$ .................. C07D 251/50; C07D 251/70; C07D 261/44
[52] U.S. Cl. ...................... 544/189; 544/187
[58] Field of Search ................. 544/189, 187

[56] References Cited

FOREIGN PATENT DOCUMENTS 61-6686 10/1962 Belgium .
0064250 11/1982 European Pat. Off. .
2113977 10/1971 Fed. Rep. of Germany .
1211910 12/1959 France .
1320423 1/1963 France .

Primary Examiner—John M. Ford
Attorney, Agent, or Firm—Stevens, Davis, Miller & Mosher

[57] ABSTRACT

Anthraquinone compounds of the formula,

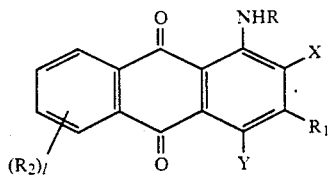

wherein R is hydrogen, alkyl or the like, $R_1$ and $R_2$ are each hydrogen, halogen or sulfo, l is 1 or 2, X is sulfo or the like or $-V-A-(W)_m-Z$, and Y is $-V_1-A_1-U$, wherein V and $V_1$ are each $-O-$ or $-S-$, A and $A_1$ are each a divalent group such as

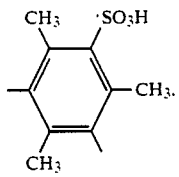

W is $-NH-$ or the like, Z is hydrogen or a fiber reactive group, and U is hydrogen, a fiber reactive group or a fiber reactive group-containing group, provided that at least one of Z and U is or has a fiber reactive group, which is useful for dyeing or printing fiber materials such as cotton to give a dyed or printed product having excellent fastness properties, particularly those such as light fastness and perspiration-light fastness.

2 Claims, No Drawings

ANTHRAQUINONE DYE COMPOUNDS HAVING FIBERS REACTIVE GROUP

The present invention relates to an anthraquinone compound, a process for producing the same and a process for dyeing or printing fiber materials therewith.

More specifically, the present invention relates to an anthraquinone compound having at least one fiber reactive group, which is useful for dyeing or printing fiber materials.

Many fiber reactive anthraquinone dyes of this kind are known, for example, as disclosed in Published Unexamined Japanese Patent Application No. 3834/1971.

However, these existing anthraquinone fiber reactive dyes become difficult to meet all needs of dye consumers with recent changes in the technical and economical situations thereof. For example, they are still waiting for improvement with respect to dyeing property which is a fundamental condition for the dye, and fastness properties of dyed or printed products, because of high demand for such properties in recent years.

The present inventors have made extensive studies to find an anthraquinone compound meeting needs described above, and found that this object can be accomplished by providing an anthraquinone compound having a specific chromophore and a specific bridging group between the chromophore and a fiber reactive group.

The present invention provides an anthraquinone compound represented by the following formula (I),

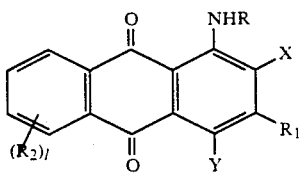

wherein

R is hydrogen or unsubstituted or substituted alkyl, cyclohexyl, phenyl, alkylcarbonyl, arylcarbonyl, alkylsulfonyl or arylsulfonyl;

$R_1$ and $R_2$ independently of one another are each hydrogen, halogen or sulfo;

l is 1 or 2;

X is hydrogen, alkyl, halogen, carboxy, sulfo or group of the formula (1), $-V-A-(W)_m-Z$; and Y is a group of the formula (2) $-V_1-A_1-U$; in which formulas (1) and (2), Z is hydrogen or a fiber-reactive group, W is a divalent group of $-O-$, $-S-$, $-NR_3-$ or $-NR_4CO-$ in which $R_3$ and $R_4$ independently of one another are each hydrogen or unsubstituted or substituted alkyl, m is 0 or 1, U is a group of the following formula (3) or (4), the formula (3) being $+W_1 \!\!+\!\!_{l_1} Z_1$ wherein $W_1$ is a divalent group of $-O-$, $-S-$, $-NR_5-$ or $-NR_6CO-$ in which $R_5$ and $R_6$ independently of one another are each hydrogen or unsubstituted or substituted alkyl, $Z_1$ is hydrogen or a fiber-reactive group, and $l_1$ is 0 or 1, and the formula (4) being

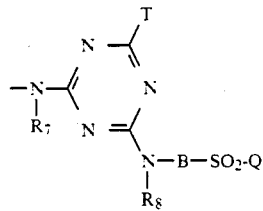

wherein $R_7$ and $R_8$ independently of one another are each hydrogen or unsubstituted or substituted alkyl, B is unsubstituted or substituted phenylene or naphthylene, Q is vinyl or $-CH_2CH_2L$ in which L is a group capable of being split by the action of an alkali, and T is fluoro, chloro or a group of the following formula (5), (6), (7) or (8), the formula (5) being

wherein $R_9$ and $R_{10}$ independently of one another are each hydrogen or unsubstituted or substituted alkyl, phenyl, naphthyl or benzyl, the formula (6) being

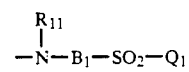

wherein $R_{11}$ is hydrogen or unsubstituted or substituted alkyl, $B_1$ is unsubstituted or substituted phenylene or naphthylene, and $Q_1$ is vinyl or $-CH_2CH_{L_1}$ in which $L_1$ is a group capable of being split by the action of an alkali, the formula (7) being

wherein $R_{12}$, $R_{13}$ and $R_{14}$ independently of one another are each unsubstituted or substituted alkyl or phenyl, and the formula (8) being

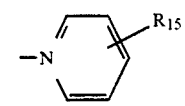

wherein $R_{15}$ is hydrogen, cyano, carbamoyl, halogen, hydroxy, vinyl, sulfo, carboxy or unsubstituted or substituted alkyl, A and $A_1$ independently of one another are each a group of the following formula (9), (10), (11) or (12), the formula (9) being

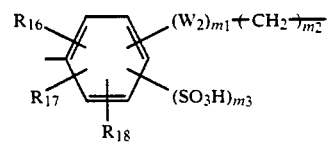

wherein $R_{16}$, $R_{17}$ and $R_{18}$ independently of one another are each hydrogen, methyl, ethyl, methoxy, ethoxy, chloro, bromo or carboxyl, $W_2$ is a divalent group of $-O-$, $-S-$, $-NR_{19}-$ or $-NR_{20}CO-$ in which $R_{19}$ and $R_{20}$ independently of one another are each hydrogen or unsubstituted or substituted alkyl, $m_1$ is 0 or 1, $m_2$ is 0, 1, 2, 3 or 4, and $m_3$ is 0, 1 or 2, the formula (10) being

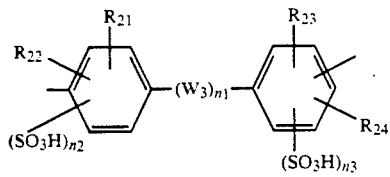

wherein $R_{21}$, $R_{22}$, $R_{23}$ and $R_{24}$ independently of one another are each hydrogen, methyl, ethyl, methoxy, ethoxy, chloro, bromo or carboxy, $W_3$ is a bridging group of $-O-$, $-S-$, $NR_{25}-$ or $-NR_{26}CO-$ in which $R_{25}$ and $R_{26}$ independently of one another are each hydrogen or unsubstituted or substituted alkyl, $n_1$ is 0 or 1, and $n_2$ and $n_3$ are each 0, 1 or 2, the formula (11) being

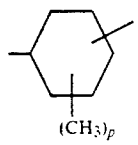

wherein p is 0, 1, 2 or 3, and the formula (12) being $+CH_2+_q$ wherein q is an integer of 2 to 6, and V and $V_1$ independently of one another are each a devalent group of $-O-$ or $-S-$, with the proviso that (a) $Z_1$ in the formula (3) is the fiber-reactive group as defined hereinabove when X is hydrogen, alkyl, halogen or carboxy, (b) at least one of Z and $Z_1$ is the fiber-reactive group as defined hereinabove when X and U in the formula (2) are the groups of the formula (1) and (3), respectively, (c) $R_1$ is hydrogen, $R_2$ is hydrogen or sulfo and U is the group of the formula (4) as defined hereinabove, when X is sulfo, (d) m is 0 when Z is hydrogen, and $l_1$ is 0 when $Z_1$ is hydrogen, and (e) at least one of R, A and $A_1$ is a sulfo-carrying group.

The present invention also provides a process for producing the compound of the formula (I), and a process for dyeing or printing fiber materials using the compound of the formula (I).

Considering the provisos as defined hereinabove, the formula (I) can be divided into the following formulas (II) to (IV),

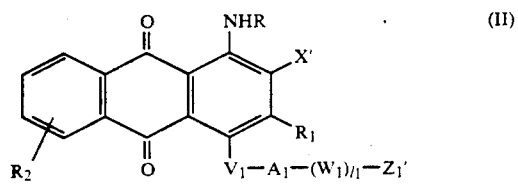

wherein X' is hydrogen, halogen, alkyl or carboxy, $Z'_1$ is a fiber reactive group, and the other symbols stand for the same meanings as defined above, respectively;

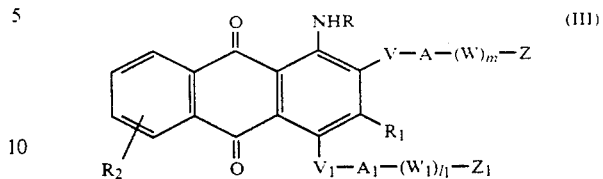

wherein all symbols stand for the same meanings as defined above, respectively, provided that at least one of Z and $Z_1$ is a fiber reactive group, and m is 0 when Z is hydrogen, and $l_1$ is 0 when Z is hydrogen; and

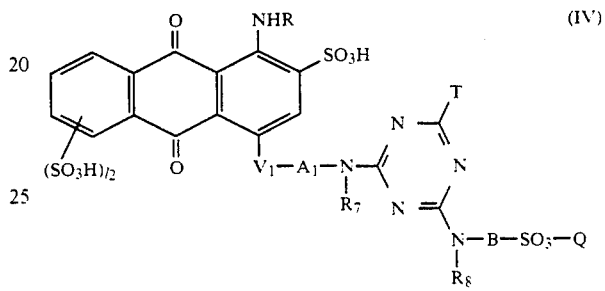

wherein $l_2$ is 0, 1 or 2, and all the other symbols stand for the same meanings as defined above, respectively; with the proviso that at least one of R, A and $A_1$ is sulfo or a sulfo-carrying group.

In the above formulas (I) to (IV), if any, the substituent of the alkyl, cyclohexyl, phenyl, alkylcarbonyl, arylcarbonyl, alkylsulfonyl and arylsulfonyl represented by R includes methyl, ethyl, methoxy, ethoxy, chloro, bromo, acetylamino, propionylamino, nitro, cyano, carbamoyl, carboxy, hydroxy, sulfato, sulfo and the like. Those represented by R may be unsubstituted or substituted thereby preferably once or twice.

Preferable examples of those represented by R are methyl, ethyl, propyl, iso-propyl, butyl, iso-butyl, carboxymethyl, 2-carboxyethyl, 2-sulfoethyl, 2-methoxyethyl, 2-ethoxyethyl, 2-hydroxyethyl, 2-sulfatoethyl, cyclohexyl, acetyl, propionyl, benzoyl, 2-, 3- or 4-sulfobenzoyl, 2-, 3- or 4-carboxybenzoyl, 2-, 3- or 4-chlorobenzoyl, 2-, 3- or 4-methoxybenzoyl, 2-, 3- or 4-methylbenzoyl, methylsulfonyl, ethylsulfonyl, phenylsulfonyl, 2-, 3- or 4-methylphenylsulfonyl, 2-, 3- or 4-chlorophenylsulfonyl, 2-, 3- or 4-sulfophenylsulfonyl, 2-, 3- or 4-carboxyphenylsulfonyl, 2-, 3- or 4-methoxyphenylsulfonyl, phenyl, 2-, 3- or 4-sulfophenyl, 2-, 3- or 4-methylphenyl, 2-, 3- or 4-chlorophenyl, 2-, 3- or 4-methoxyphenyl, 2-, 3- or 4-carboxyphenyl and the like.

In the above formulas (I) to (III), preferably $R_1$ is hydrogen and $R_2$ is hydrogen or sulfo.

The divalent groups represented by W and $W_1$ in the formulas (1) and (3) are preferably $-NR_3-$ and $-NR_5-$ in which $R_3$ and $R_5$ are as defined above, respectively. The alkyls represented by both $R_3$ and $R_5$ are preferably $C_1 \sim C_4$ alkyls unsubstituted or substituted by hydroxy, cyano, $C_1 \sim C_4$ alkoxy, chloro, bromo, carboxy, carbamoyl, $C_1 \sim C_4$ alkoxycarbonyl, $C_1 \sim C_4$ alkylcarbonyloxy, sulfo, sulfamoyl or the like. Of these, preferred $R_3$ and $R_5$ are hydrogen, methyl and ethyl.

Among the groups represented by A and $A_1$, preferred are those of the formula (9) wherein $W_2$ is —O—, —NH— or —NHCO—, $m_2$ is 0, 1 or 2, and m, and $m_3$ are each 0 or 1, those of formula (10) wherein $W_3$ is —O—, —NH— or —NHCO—, and $n_2$ and $n_3$ are each 1 or 2, those of the formula (11) wherein p is 0, 1 or 2, and those of the formula (12) wherein q is 2, 3 or 4.

The alkyl represented by $R_7$ and $R_8$ in the formula (4) and R in the formula (6) includes those disclosed in Published Unexamined Japanese Patent Application No. 176355/1984. In the present invention, $R_7$ is preferably hydrogen or methyl, and $R_8$ and $R_1$ are each hydrogen, methyl or ethyl.

Examples of the phenylene and naphthylene represented by B and $B_1$ are as shown below:

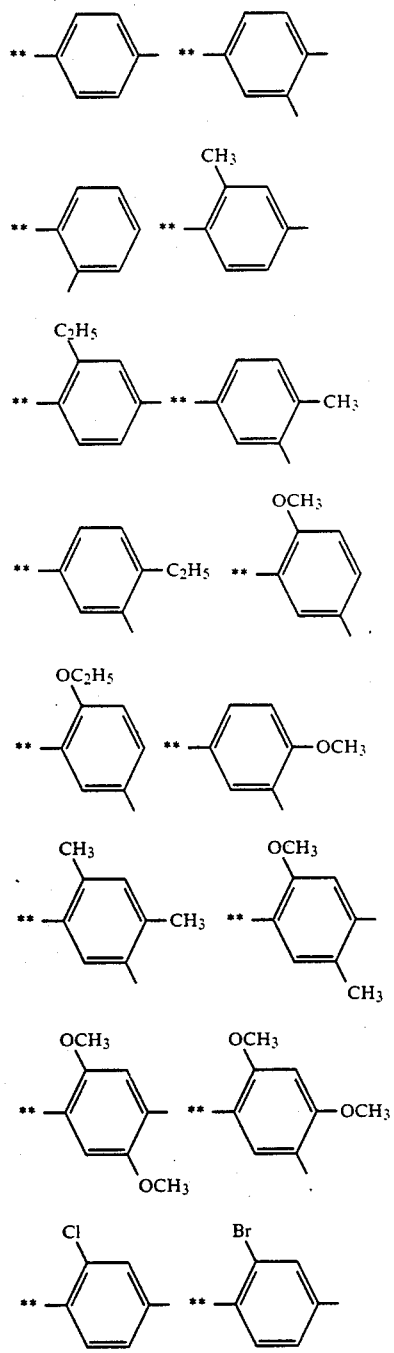

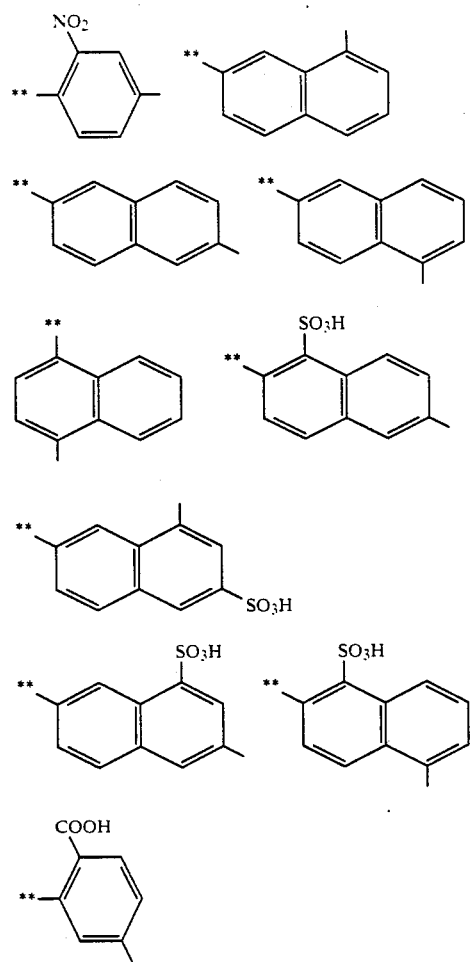

wherein the linkage marked with ** bonds to —$NH_8$— or $NR_{11}$. Among those exemplified above, particularly preferred are phenylene unsubstituted or substituted by methyl or methoxy, and β-naphthylene unsubstituted or substituted by sulfo.

The group which is capable of being split by the action of an alkali and represented by L and $L_1$ when Q and $Q_1$ are —$CH_2CH_2L$ and —$CH_2CH_2L_1$, respectively, is well known in the art, and includes, for example, sulfato, thiosulfato, acetoxy and chloro. Of these, particularly preferred is β-sulfatoethyl which may be partially replaced by vinyl.

With respect to the symbol T in the formula (4), the alkyl represented by $R_9$ and $R_{10}$ preferably includes ones having 1 to 4 carbon atoms, which are unsubstituted or substituted once or twice by $C_1 \sim C_4$ alkoxy, sulfo, carboxy, hydroxy, chloro, phenyl or sulfato. Examples thereof are methyl, ethyl, n-propyl, iso-propyl, n-butyl, iso-butyl, sec-butyl, 8-hydroxyethyl, 8-sulfatoethyl, β-sulfoethyl, β-methoxyethyl, β-carboxyethyl and the like.

The phenyl represented by $R_9$ and $R_{10}$ preferably includes ones unsubstituted or substituted once or twice by $C_1 \sim C_4$ alkyl, $C_1 \sim C_4$ alkoxy, sulfo, carboxy or chloro. Examples thereof are phenyl, 2-, 3- or 4-sulfophenyl, 2-, 3- or 4-carboxyphenyl, 2-, 3- or 4-chlorophenyl, 3,4-, 3,5- or 3,6-disulfophenyl and the like.

The naphthyl represented by $R_9$ and $R_{10}$ preferably includes ones unsubstituted or substituted once, twice or three times by hydroxy, carboxy, sulfo, $C_1 \sim C_4$ alkyl, $C_1 \sim C_4$ alkoxy or chloro. Examples thereof are 2-, 3-, 4-, 5-, 6-, 7- or 8-sulfo-1-naphthyl, 1-, 5-, 6-, 7- or 8-sulfo-2-naphthyl, 2,4-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

The benzyl represented by $R_9$ and $R_{10}$ preferably includes ones unsubstituted or substituted once or twice by $C_1 \sim C_4$ alkyl, $C_1 \sim C_4$ alkoxy, sulfo or chloro. Examples thereof are benzyl, 2-, 3- or 4-sulfobenzyl and the like.

In the above formula (7), $R_{12}$ and $R_{13}$ are each preferably methyl, and $R_{14}$ is preferably methyl, ethyl, propyl, butyl, hydroxyethyl, hydroxypropyl, methoxyethyl, ethoxyethyl, 2-diethylaminoethyl, 3-diethylaminopropyl, carboxymethyl and carboxyethyl. Of these, particularly preferred is the $C_1 \sim C_4$ alkyl.

In the above formula (8), $R_{15}$ is preferably hydrogen, carbamoyl and carboxy.

Among those represented by T in the formula (4), particularly preferred are chloro, and those represented by the formula (5) wherein $R_9$ is hydrogen, methyl or ethyl, and $R_{10}$ is the phenyl as exemplified above.

Among the divalent groups represented by $V_1$ in the formula (2), particularly preferred is —S—.

In the present invention, the fiber reactive groups represented by Z and $Z_1$ include those capable of reacting with —OH or —NH— present in the fiber under certain dyeing conditions to form a covalent bond.

More specifically, the fiber reactive groups include aromatic ones having at least one fiber reactive substituent on 5- or 6-membered aromatic hetercyclic ring or mono- or poly-condensed aromatic carbocyclic ring, aliphatic ones and those formed by combination thereof through a suitable bridging group. The heterocyclic ring includes, for example, monoazines, diazines and triazines such as pyridine, pyrimidine, pyridazine, pyrazine, thiazine, oxazine, asymmetric or symmetric triazine and the like, and the carbocyclic ring includes, for example, quinoline, phthalazine, cinnoline, quinazoline, quinoxaline, acridine, phenazine, phenanthridine and the like.

The fiber reactive substituent on the heterocyclic and carbocyclic rings includes halogen (i.e. chlorine, bromine, fluorine), ammonium including hydrzinium, sulfonium, sulfonyl, azido (—$N_2$), thiocyanate, thio, thioether, oxyether, sulfino, sulfo and the like.

As such heterocyclic and carbocyclic ring fiber reactive groups, there are exemplified 2,4-difluorotriazin-6-yl, 2,4-dichlorotriazin-6-yl and monohalo-s-triazinyl groups particularly monochloro- or monofluoro-triazinyl groups substituted by alkyl, aryl, amino, monoalkylamino, dialkylamino, aralkylamino, arylamino, alkoxy, aryloxy, alkylthio or arylthio, such as, for example, 2-amino-4-fluorotriazin-6-yl, 2-methylamino-4-fluorotriazin-6-yl, 2-ethylamino-4-fluorotriazin-6-yl, 2-isopropylamino-4-fluorotriazin-6-yl, 2-dimethylamino-4-fluorotriazin-6-yl, 2-diethylamino-4-fluorotriazin-6-yl, 2-β-methoxyethylamino-4-fluorotriazin-6-yl, 2-β-hydroxyethylamino-4-fluorotriazin-6-yl, 2-di-(β-hydroxyethylamino)-4-fluorotriazin-6-yl, 2-'-sulfoethylamino-4-fluorotriazin-6-yl, 2-carboxymethylamino-4-fluorotriazin-6-yl, 2-di-(carboxymethylamino)-4-fluorotriazin-6-yl, 2-sulfomethylmethylamino-4-fluorotriazin-6-yl, 2-8-cyanoethylamino-4-fluorotriazin-6-yl, 2-benzylamino-4-fluorotriazin-6-yl, 2-β-phenylethylamino-4-fluorotriazin-6-yl, 2-benzylmethylamino-4-fluorotriazin-6-yl, 2-(β-sulfobenzyl)-amino-4-fluorotriazin-6-yl, 2-cyclohexylamino-4-fluorotriazin-6-yl, 2-(o-, m- or p-methylphenyl)-amino-4-fluorotriazin-6-yl, 2-(o-, m- or p-sulfophenyl)-amino-4-fluorotriazin-6-yl, 2-(2', 5'-disulfophenyl)-amino-4-fluorotriazin-6-yl, 2-(o-, m- or p-chlorophenyl)-amino-4-fluorotriazin-6-yl, 2-(o-, m- or p-methoxyphenyl)-4-fluorotriazin-6-yl, 2-(2'-methyl-4'-sulfophenyl)-amino-4-fluorotriazin-6-yl, 2-(2'-methyl-5'-sulfophenyl)-amino-4-fluorotriazin-6-yl, 2-(2'-chloro-4'-sulfophenyl)-amino-4-fluorotriazin-6-yl, 2-(2'-chloro-5'-sulfophenyl)-amino-4-fluorotriazin-6-yl, 2-(2'-methoxy-4.-sulfophenyl)-amino-4-fluorotriazin-6-yl, 2-(o-, m- or p-carboxyphenyl)-amino-4-fluorotriazin-6-yl, 2-(2',4'-disulfophenyl)-amino-4-fluorotriazin-6-yl, 2-(3',5'-disulfophenyl)-amino-4-fluorotriazin-6-yl, 2-(2'-carboxy-4'-sulfophenyl)-amino-4-fluorotriazin-6-yl, 2-(2'-carboxy-5'-sulfophenyl)-amino-4-fluorotriazin-6-yl, 2-(6'-sulfophen-2'-yl)-amino-4-fluorotriazin-6-yl, 2-(4',8'-disulfonaphth-2'-yl)-amino-4-fluorotriazin-6-yl, 2-(6',8'-disulfonaphth-2'-yl)-amino-4-fluorotriazin-6-yl, 2-(N-methylphenyl)-amino-4-fluorotriazin-6-yl, 2-(N-ethylphenyl)-amino-4-fluorotriazin-6-yl, 2-(N-β-hydroxyethylphenyl)-amino-4-fluorotriazin-6-yl, 2-(N-isopropylphenyl)-amino-4-fluorotriazin-6-yl, 2-morpholino-4-fluorotriazin-6-yl, 2-piperidino-4-fluorotriazin-6-yl, 2-(4',6',8'-trisulfonaphth-2'-yl)-4-fluorotriazin-6-yl, 2-(3',6',8'-trisulfonaphth-2'-yl)-4-fluorotriazin-6-yl, 2-(3',6'-disulfonaphth-1'-yl)-4-fluorotriazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, 2-methoxy-4-fluorotriazin-6-yl, 2-ethoxy-4-fluorotriazin-6-yl, 2-phenoxy-4-fluorotriazin-6-yl, 2-(o-, m- or p-sulfophenoxy)-4-fluorotriazin-6-yl, 2-(o-, m- or p-methyl or methoxyphenyl)-4-fluorotriazin-6-yl, 2-8-hydroxyethylmercapto-4-fluorotriazin-6-yl, 2-phenylmercapt-4-fluorotriazin-6-yl, 2-(4'-methylphenyl)-mercapto-4-fluorotriazinyl, 2-(2',4'-dinitrophenyl)-mercapto-4-fluorotriazin-6-yl, 2-methyl-4-fluorotriazin-6-yl, 2-phenyl-4-fluorotriazin-6-yl, the corresponding 4-chloro- or 4-bromotriazinyl groups, and the other groups corresponding to the above wherein the halo is substituted with tertiary amines such as trimethylamine, triethylamine, dimethyl-β-hydroxyethylamine, triethanolamine, N,N-dimethylhydrazine, pyridine and pycoline, nicotinic acid, isonicotinic acid, sulfinates particularly such as benzene-sulfinate, or hydrogensulfites; mono-, di- or trihalo-pyrimidinyl groups such as 2,4-dichloropyrimidin-6-yl, 2,3,5-trichloropyrimidine-6-yl, 2,4-dichloro-5-nitro, methyl-, carboxymethyl-, carboxy-, cyano, vinyl-, sulfo-, mono-, di- or trichloromethyl- or carboalkoxypyrimidin-6-yl, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl and 2,4-dichloropyrimidine-5-sulfonyl; 2-chloro-quinoxaline-3-carbonyl, 2- or 3-monochloroquinoxaline-6-carbonyl, 2- or 3-monochloroquinoxaline-6-sulfonyl, 2,3-dichloroquinoxaline-6-carbonyl, 2,3-dichloroquinoxaline 6-sulfonyl, 1,4-dichlorophthalazine-6-sulfonyl or -carbonyl; 2,4-dichloroquinazoline-7- or 6-sulfonyl or -carbonyl, 2-, 3-, or 4-(4 , 5'-dichloropyridaz-6'-on-1'-yl)phenylsulfonyl or -phenylcarbonyl, 8-(4',5'-dichloropyridaz-6'-on-1'-yl)-ethylcarbonyl, N-methyl-N-(2,3-dichloroquinoxaline-6-sulfonyl)-aminoacetyl, N-methyl-N-(2,3-dichloroquinoxaline-6-carbonyl)-aminoacetyl, and the bromine or fluorine derivatives corresponding to the above chloro-substituted heterocyclic groups, such as, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-ethyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2 chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, phenyl or -methylsulfonylmethyl-4-pyrimidinyl, 2-fluoro-5-carboxamid-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamid-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2-fluoro-4 dichloromethyl-5-chloropyrimidin-6-yl, 2-fluoro-5-chloropyrimidin-4-yl, 2-methyl-4-fluoro-5-methylsulfonyl pyrimidin-6-yl, 2,6-difluoro-5-methylsulfonyl-4-pyrimidinyl, 2,6-dichlor-5-methylsulfonyl-4-pyrimidinyl, 2-fluoro-5-sulfonamid-4-pyrimidinyl, 2-fluoro-5-chloro-6-carbomethoxy-4-pyrimidinyl and 2,6-difluoro-5-trifluoromethyl-4-pyrimidinyl, sulfonyl-containing triazine groups such as 2,4-bis-(phenylsulfonyl)-triazin-6-yl, 2-(3'-carboxyphenyl)-sulfonyl-4-chlorotriazin-6-yl, 2-(3'-sulfophenyl)-sulfonyl-4-chlorotriazin-6-yl and 2,4-bis(3'-carboxyphenylsulfonyl)-triazin-6-yl, sulfonyl-containing pyrimidine groups such as 2-carboxymethylsulfonyl-pyrimidin-4-yl, 2-methylsulfonyl-6-methylpyrimidin-4-yl, 2-methylsulfonyl-6-ethylpyrimidin-4-yl, 2-phenylsulfonyl-5-chloro-6-methylpyrimidin-4-yl, 2,6-bis-methylsulfonyl-pyrimidin-4-yl, 2,6-bis-methylsulfonyl-5-chloropyrimidin-4-yl, 2,4-bis-methylsulfonyl-pyrimidin-5-sulfonyl, 2-methylsulfonyl-pyrimidin-4-yl, 2-phenylsulfonylpyrimidin-4-yl, 2-trichloromethylsulfonyl-6-methylpyrimidin-4-yl, 2-methylsulfonyl-5-chloro-6-methylpyrimidin-4-yl, 2-methylsulfonyl-5-bromo-6-methyl pyrimidin-4-yl, 2-methylsulfonyl-5-chloro-6-ethylpyrimidin-4-yl, 2-methylsulfonyl-5-chloro-6-chloromethylpyrimidin-4-yl, 2-methylsulfonyl-4-chloro-6-methylpyrimidin-5-sulfonyl, 2-methylsulfonyl-5-nitro-6-methylpyrimidin-4-yl, 2,5,6-tris-methylsulfonylpyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bismethylsulfonyl-5-chloro-pyrimidin-4-yl, 2-methylsulfonyl-6-carboxypyrimidin-4-yl, 2-methylsulfonyl-5-sulfopyrimidin-4-yl, 2-methylsulfonyl-6-carbomethoxy-pyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2-methylsulfonyl-6-chloropyrimidin-4- or 5-carbonyl, 2,6-bis-(methylsulfonyl)-pyrimidin-4- or 5-carbonyl, 2-ethylsulfonyl-6-chloropyrimidin-5-sulfonyl, 2,4-bis-(methylsulfonyl)-pyrimidin-5-sulfonyl, and 2-methylsulfonyl-4-chloro-6-methylpyrimidin-5-sulfonyl or -carbonyl, 2-chlorobenzothiazol-5- or 6-carbonyl or 5- or 6-sulfonyl, and 2-aryl- or alkyl-sulfonyl-benzothiazol-5- or 6-carbonyl or -sulfonyl such as 2-phenylsulfonylbenzothiazol-5- or 6-carbonyl or -sulfonyl and 2-methyl- or ethylsulfonyl-benzothiazol-5- or 6-sulfonyl or carbonyl, and those corresponding to the 2-sulfonylbenzothiazol-5- or 6-carbonyl or sulfonyl groups, which have sulfo on the condensed benzene ring, 2 chlorobenzoxazol-5- or 6-carbonyl or -sulfonyl, 2-chlorobenzimidazol-5- or 6-carbonyl or -sulfonyl, 2-chloro-1-methylbenzimidazol-5- or 6-carbonyl or -sulfonyl, 2-chloro-4-methyl-1,3-thiazol-5-carbonyl or -4- or -5-sulfonyl, N-oxide of chloro- or nitro-quinolin-5- carbonyl, and the like.

Examples of the aliphatic fiber reactive group are acryloyl, mono-, di- or tri-chloroacryloyl such as
—CO—CH⊙CHCl, —CO—CCl=CH₂,
—CO—CCl=CH—CH₃, —CO—CCl=CH—COOH
and —CO—CH=CCl—COOH, β-chloropropionyl, 3-phenylsulfonylpropionyl, 3-methylsulfonylpropionyl, 2-fluoro-2-chloro-3,3-difluorocyclobutan-1-carbonyl, 2,2,3,3-tetrafluorocyclobutan-1-carbonyl or -sulfonyl, β(2,2,3,3-tetrafluorocyclobutyl)-allyloxy, α or β-bromoacryloyl, α- or β-alkyl- or allyl-sulfoacryloyl such as α- or β-methylsulfonylacryloyl, chloroacetyl, vinylsulfonyl, —SO₂CH₂CH₂L in which L is as defined above, and the like.

Among the fiber reactive groups described above, preferred are those represented by the following formulas (13) to (17);

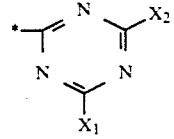

(13)

wherein $X_1$ and $X_2$ independently of one another are each chloro, fluoro,

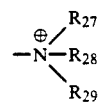

in which $R_{27}$, $R_{28}$ and $R_{29}$ independently of one another are each unsubstituted or substituted alkyl,

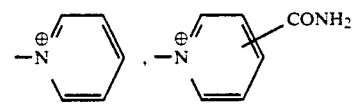

or

-continued

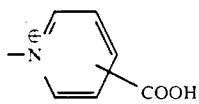

and the asterisked linkage bonds to W or $W_1$,

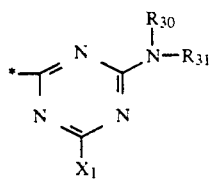
(14)

wherein $R_{30}$ is hydrogen or unsubstituted or substituted alkyl $R_{31}$ is hydrogen or unsubstituted or substituted alkyl, phenyl or naphthyl, and $X_1$ and the asterisked linkage are as defined above,

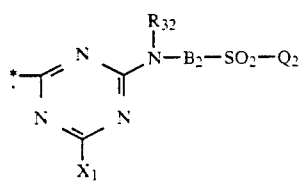
(15)

wherein $R_{32}$ is hydrogen or unsubstituted or substituted alkyl, $B_2$ is phenylene unsubstituted or substituted once or twice by methyl, ethyl, methoxy, ethoxy, chloro, bromo, sulfo, carboxy or nitro, or naphthylene unsubstituted or substituted by sulfo, $Q_2$ is vinyl or —$CH_2CH_2L_2$ in which $L_2$ is a group capable of being split by the action of an alkali, $X_1$ and the asterisked linkage are as defined above.

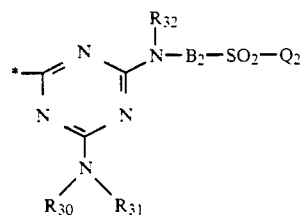
(16)

wherein $R_{30}$, $R_{31}$, $R_{32}$, $B_2$, $Q_2$ and the asterisked linkage are as defined above, and

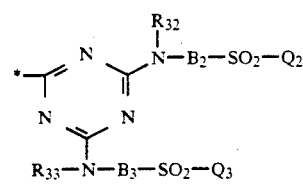
(17)

wherein $R_{33}$ is hydrogen or unsubstituted or substituted alkyl, $B_3$ is phenylene unsubstituted or substituted once or twice by methyl, ethyl, methoxy, ethoxy, chloro, bromo, sulfo, carboxy or nitro, or naphthylene unsubstituted or substituted by sulfo, $Q_3$ is vinyl or —$CH_2CH_2L_3$ in which $L_3$ is a group capable of being split by the action of an alkali, and $R_{32}$, $B_2$, $Q_2$ and the asterisked linkage are as defined above.

Of these, particularly preferred are those represented by the formula (15) wherein $X_1$ is chloro, $R_{32}$ is hydrogen, methyl or ethyl, $B_2$ is phenylene unsubstituted or substituted by methyl or methoxy or $\beta$-naphthylene unsubstituted or substituted by sulfo, and $Q_2$ is vinyl or $\beta$-sulfatoethyl, those represented by the formula (16) wherein $R_{30}$ is hydrogen, methyl or ethyl, $R_{31}$ is phenyl unsubstituted or substituted by sulfo, carboxy, methyl, methoxy or chloro, $R_{32}$ is hydrogen, methyl or ethyl, $B_2$ is phenylene unsubstituted or substituted by methyl or methoxy, or $\beta$-naphthylene unsubstituted or substituted by sulfo, $Q_2$ is vinyl or $\beta$-sulfatoethyl, and those represented by the formula (17) wherein $R_{32}$ and $R_{33}$ independently of one another are each hydrogen, methyl or ethyl, $B_2$ and $B_3$ independently of one another are each phenylene unsubstituted or substituted by methyl or methoxy, or $\beta$-naphthylene unsubstituted or substituted by sulfo, and $Q_2$ and $Q_3$ independently of one another are each vinyl or $\beta$-sulfatoethyl.

In the present specification, the term "alkyl" is preferably alkyl having 1 to 4 carbon atoms, unless otherwise specified.

The anthraquinone compound represented by the formula (I) may be in the form of a free acid or an alkali metal or alkaline earth metal salt, such as sodium salt, potassium salt and the like.

The present anthraquinone compound (I) can be readily produced in a manner known per se.

For example, respective compounds represented by the following formulas (V), (VI) and (VII),

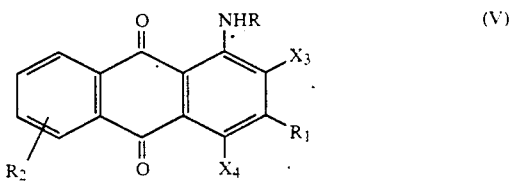
(V)

(VI)

(VII)

wherein $X_3$ and $X_4$ independently of one another are each a splittable group such as chloro, bromo, nitro and the like, and R, $R_1$, $R_2$, V, $V_1$, A, $A_1$, W, $W_1$, Z, $Z_1$, m and $l_1$ are as defined above, can be used to obtain the anthraquinone compound of the formula (III). More specifically speaking, the compounds (V) and (VII) are subjected to condensation reaction with each other in a usual manner, followed by condensation reaction with the compound (VI) in a usual manner, if necessary, further followed by sulfonation using sulfuric acid or oleum.

Moreover, a compound of the following formula (VIII),

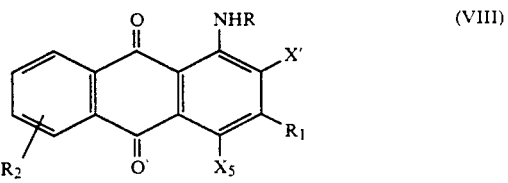
(VIII)

wherein $X_5$ is a splittable group such as chloro, bromo, nitro and the like, and R, $R_1$, $R_2$ and X' are as defined above, and the compound of the above formula (VII) can be used to obtain the anthraquinone compound of the formula (II). That is, the compounds (VII) and (VIII) are subjected to condensation reaction with each other in a usual manner, if necessary, followed by sulfonation using sulfuric acid or oleum.

In the above production methods, in case where the fiber reactive groups (Z and $Z_1$) are those capable of being readily formed by converting their precursor group even after completion of the condensation reactions, such as, for example, β-sulfatoethylsulfonyl, it is preferred to use their precursor starting compounds, such as those having β-hydroxyethylsulfonyl. While, in case where the fiber reactive groups are heterocyclic ones, it is preferred to form the divalent groups (W and $W_1$) after completion of the condensation reactions, so that the fiber reactive groups can be introduced.

Furthermore, cyanuric chloride or fluoride and respective compounds represented by the following formulas (IX), (X) and (XI),

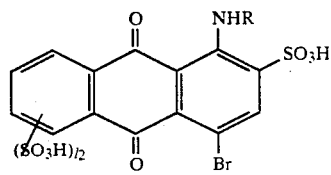
(IX)

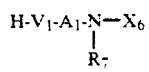
(X)

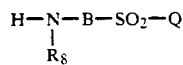
(XI)

wherein $l_2$ is 0, 1 or 2 and $X_6$ is hydrogen or an amino-protecting group such as acetyl, and R, $R_7$, $R_8$, $A_1$, B, $V_1$ and Q are as defined above, can be used, if necessary together with any one of compounds represented by the following formulas (XII) to (XV),

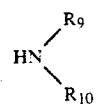
(XII)

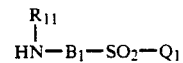
(XIII)

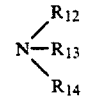
(XIV)

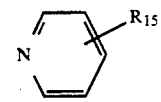
(XV)

wherein $R_9$, $R_{10}$, $R_{11}$, $R_{12}$, $R_{13}$, $R_{14}$, $R_{15}$, $B_1$ and $Q_1$ are as defined above, to obtain the anthraquinone compound of the formula (IV). That is, the compound (IX) is subjected to Ullmann's condensation reaction with the compound (X), and thereafter the condensate can be subjected to hydrolysis in the presence of an alkali or acid when it has the amino-protecting group such as acetyl as $X_6$, whereby a chromophor compound for the anthraquinone compound of the formula (IV) can be obtained. Successively, the chromophor compound is subjected to condensation reaction with the compound (XI) and cyanuric chloride or fluoride one after another, if desired, followed by condensation reaction with any one of the compounds (XII) to (XV).

Examples of the compound (V) usable for the production of anthraquinone compound represented by the formula (III) are 1-amino-2,4-dibromoanthraquinone, 1-amino-2-bromo-4-nitroanthraquinone, 1-amino-2,4-dichloroanthraquinone, 1-amino-2,4-dibromoanthraquinone-5-, 6-, 7- or β-sulfonic acid and the like.

As to the compounds (VI) and (VII) usable therefor, examples of the groups H-V-A- and H-$V_1$A-1 in the formulas (VI) and (VII), respectively, are hydroxymethyl, hydroxyethyl, 2-hydroxypropyl, 3-hydroxypropyl, 3-hydroxybutyl, 4-hydroxybutyl, 4-hydroxyphentyl, 1,2-dihydroxyethyl, 2-hydroxy-1-sulfoethyl, 2-hydroxy-1-methoxyethyl, 1-carboxy-2-hydroxyethyl, 3- or 4-hydroxycyclohexyl, 3-hydroxy-2- or 4-methylcyclohexyl, 3-hydroxy-5,5-dimethylcyclohexyl, 5-hydroxy-2,4,6- trimethyl-3-sulfophenyl, 5-hydroxy-2-methyl-4-sulfophenyl, 4- or 5-hydroxu-2-sulfophenyl, 4-hydroxy-5-methyl-2-sulfophenyl, 5-hydroxy-2-methyl-3-sulfophenyl, 5-hydroxy-4-methoxy-2-sulfophenyl, 5-hydroxy-2-methoxy-4-sulfophenyl, 4-hydroxy-5-chloro-2-sulfophenyl, 4-hydroxy-5-carboxy-3-sulfophenyl, 4-(2-hydroxyethoxy)-3-sulfophenyl, 4-(2-hydroxyethoxy)-2-methyl-5-sulfophenyl, 4-(2-hydroxyethoxy)-2-methoxy-5-sulfophenyl, 4-(hydroxyethylamino)-2-chloro-5-sulfophenyl, 4-(hydroxyethylamino)-2-carboxy-5-sulfophenyl, 4-(2-hydroxyethylcarbamoyl)-2-sulfophenyl, 5-(2-hydroxypropionylamino)-2-sulfophenyl, 4'-hydroxy-3',2-disulfobiphenyl, 4'-hydroxy-3',3-disulfobiphenyl, 4-[(4'-hydroxy-2'-sulfo)phenylamino]-2-sulfophenyl, 4-[(3'-hydroxy-4'-sulfo)phenylamino]-2-sulfophenyl, 4-[(4'-hydroxy-2'-sulfo)phenylcarbamoyl]-2-sulfophenyl, 4-[(3'-hydroxy-4'-sulfo)phenylcarbamoyl]-2-sulfophenyl, 4-[(4'-hydroxy-3 -sulfo)benzoylamino]-3-sulfophenyl, 5-[(4'-hydroxy-3'-sulfo)benzoylamino]-2-sulfophenyl, their analogues having mercapto in place of hydroxy, and the like.

Examples of the compound (VIII) usable for the production of anthraquinone compound represented by the formula (II) are 1-amino-2,4-dibromoanthraquinone, 1-amino-2-bromo-4-nitroanthraquinone, 1-cyclohexylamino-4-bromoanthraquinone, 1-benzoylamino-4-bromoanthraquinone, 1-isopropylamino-2-carboxy-4-bromoanthraquinone, 1-cyclohexylamino-4-bromoanthraquinone-5-, 6-, 7- or 8-sulfonic acid and the like.

Examples of the compound [IX] usable for the production of anthraquinone compound represented by the formula (IV) are 1-amino-4-bromoanthraquinone-2-sulfonic acid, 1-amino-4-bromoanthraquinone-2,6- or 2,7-disulfonic acid, 1-amino-4-bromoanthraquinone-2,5,8-trisulfonic acid, 1-methylamino-4-bromoanthraquinone-2-sulfonic acid, 1-ethylamino-4-bromoanthraquinone-2-sulfonic acid, 1-propylamino-4-bromoanthraquinone-2-sulfonic acid and the like.

Examples of the compound (X) usable therefor are 2,4,6-trimethyl-3-mercapto-5-aminobenzenesulfonic acid, -mercapto-4-aminobenzene-1,5-disulfonic acid, 2-mercapto-5-aminobenzene-1,4-disulfonic acid, 5-mercapto-2-amino-4-methoxybenzenesulfonic acid, 1-mercapto-3-aminocyclohexane, 1-mercapto-4-aminocyclohexane, 2- or 4-methyl-1-mercapto-3-aminocyclohexane, 5,5-dimethyl-1-mercapto-3-aminocyclohexane, 1-mercapto-4-N-methyl, -N-ethyl or -N-carboxyethylaminocyclohexane, 4-mercaptomethyl-2-amino-5-methylbenzenesulfonic acid, 4- or 5-mercaptomethyl-2-aminobenzenesulfonic acid, 5-mercaptomethyl-3-amino-2,4-dimethylbenzenesulfonic acid, 6-mercaptomethyl-2-amino-3-methoxybenzenesulfonic acid, 3-mercaptomethyl-2-amino-5-methylbenzenesulfonic acid, 4-mercaptomethyl-2-amino-5-methoxybenzenesulfonic acid, 5-mercaptomethyl-2-aminobenzene-1,4-disulfonic acid, 4-mercaptomethyl-2-amino-5-ethylbenzenesulfonic acid, 1-mercapto-2-aminoethane, 1-mercapto-3-aminopropane, 1-mercapto-4-aminobutane, 1-mercapto-6-aminohexane, 4-mercapto-4'-aminobiphenyl-2,2'-disulfonic acid, 4-mercapto-4'-aminobiphenyl-3'-sulfonic acid, 1-mercapto-3- or 4-aminobenzene, 2-mercapto-4 or 5-aminobenzenesulfonic acid, 1-mercapto-4-N-(β-carboxyethyl)aminobenzene, 4-(β-mercaptoethylamino)aniline, 4-(γ-mercaptopropylamino)aniline, 4-(β-mercaptoethylamino)aniline-2- or 3-sulfonic acid, 4-(β-mercaptoethylamino)aniline-2,5-disulfonic acid, 4-(3'-mercaptophenylamino)aniline, 4-(4'-mercaptophenylamino)aniline, 4-(3'-mercaptophenylamino)aniline-2- or 3 sulfonic acid, 4-(4'-mercaptophenylamino)aniline- 2- or 3-sulfonic acid, 4-(3'-mercapto-4'-sulfo)phenylamino aniline, 4-(4'-mercapto-3'-sulfo)phenylamino aniline, 4-(3'-mercapto-4'-sulfo)phenylamino aniline-2- or 3-sulfonic acid, 4-(4'-mercapto-3'-sulfo)phenylamino aniline-2- or 3-sulfonic acid, 4-(4'-mercapto-3'-sulfo)phenylamino aniline-2,5-disulfonic acid, 4-(β-mercaptoethoxy)-aniline-2- or 5-sulfonic acid, 4-(β-mercaptoethoxy)-2-methylaniline-3- or 5-sulfonic acid, 4-(β-mercaptoethylcarbamoyl)aniline-2-sulfonic acid, 5-(β-mercaptopropionylamino)aniline-2- or 4-sulfonic acid, 4-[(4'-mercapto-2'-sulfo)phenylcarbamoyl]aniline-2-sulfonic acid, 4-[(3'-mercapto-4'-sulfo)phenylcarbamoyl]aniline-2-sulfonic acid, 4-[(4'-mercapto-3'-sulfo)benzoylamino]aniline-2- or 5-sulfonic acid, their analogues having hydroxy in place of mercapto, and the like.

After completion of the reaction, the desired anthraquinone compound-containing reaction mixture may be formed to a liquid commercial product, if desired, after removing inorganic salts and with addition of a stabilizer or a dyeing improver. The liquid product obtained or the aforesaid reaction mixture may be subjected to evaporation such as spray-drying, thereby obtaining a pulverulent commercial product. Alternatively according to a conventional manner, the reaction mixture may be formed into either a liquid or pulverulent commercial product through salting-out using an electrolyte.

The anthraquinone compound (I) of the present invention is fiber-reactive and useful for dyeing or printing hydroxyl group-containing and amide group-containing materials, preferably in a fibrous form or a mixed fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fiber such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing can be carried out in a manner suitable for the reactivity of the fiber reactive dye.

For example, cellulose fiber materials can be dyed using the anthraquinone compound of the present invention together with an acid binding agent such as sodium hydroxide, sodium carbonate, phosphates, silicates and sodium hydrogencarbonate in a manner which can be selected from those depending on the property of fibers and physical shape thereof. Examples of the manner applicable are exhaustion dyeing, printing, cold pad batch-up and the other methods.

The exhaustion dyeing can be carried out at a relatively low temperature in the presence of an acid binding agent such as sodium carbonate, trisodium phosphate, sodium hydroxide and the like as well as a neutral salt such as sodium sulfate, sodium chloride and the like.

The printing can be carried out by printing the fiber materials with a printing paste containing a paste or emulsified paste such as sodium alginate, starch ether and the like, and an alkali agent such as sodium carbonate, sodium hydrogencarbonate, trisodium phosphate, sodium trichloroacetate and other alkaline or alkali-liberating agents such as potassium or alkaline earth metal salts corresponding to the above, if desired together with a conventional printing auxiliary agent such as urea or a dispersing agent, followed by drying and heat-treating particularly in the presence of steam.

The cold pad batch-up dyeing can be carried out by padding the fiber materials with a padding liquor at ambient temperature, batching up and allowing them to stand on a roller for 3 hours or more or over-night, followed by washing with water and drying. The padding liquor can be prepared in a conventional manner using an acid binding agent such as sodium hydroxide alone or a mixture of sodium hydroxide with sodium silicate, sodium carbonate or trisodium phosphate, and if desired, sodium sulfate or sodium chloride optionally together with a dissolution auxiliary agent such as urea and a penetrant.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalenesulfonic acid, or an addition product between stearylamine and ethylene oxide, and the like.

The present anthraquinone compound ca be characterized by superior dye performance in the dyeing and printing of fiber materials, particularly cellulose fiber materials. For example, the present anthraquinone compound can exhibit high exhaustion and fixation percentages and superior build-up property as well as superior level-dyeing and washing-off properties and high robustness so that a shade to be obtained can hardly be affected by some changes in dyebath conditions such as dyeing temperatures, bath ratios, salt concentrations and the like.

Moreover, the dyed or printed products are excellent in fastness properties such as light fastness, perspiration-light fastness, perspiration fastness, acid-hydrolysis fastness, washing fastness, chlorine fastness and the like.

The present invention is illustrated in more detail with reference to the following Examples, which are only illustrative, but not limitative for the scope of the present invention. In Examples, parts are by weight.

EXAMPLE 1

1-Amino-2-(3'-amino-4'-sulfophenoxy)-4-(4'-sulfophenylthio)anthraquinone (6 parts) and cyanuric chloride (1.8 parts) were subjected to condensation reaction in an aqueous medium in a conventional manner, followed by condensation reaction with 1-aminobenzene-3-β-sulfatoethylsulfone (2.8 parts) at 20° to 40° C. under weak acid conditions. Thereafter, salting out of the reaction mixture with sodium chloride gave an anthraquinone compound of the following formula (free acid form).

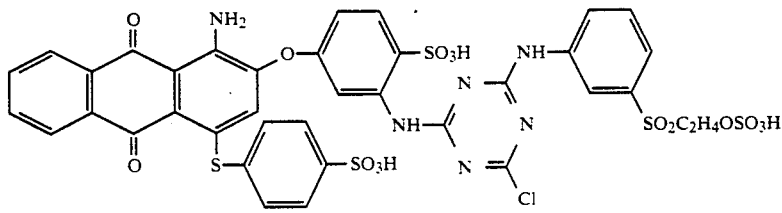

λmax 520 nm

Using the anthraquinone compound, cellulose fiber materials such as cotton can be dyed by the dyeing methods described hereinabove, for example, exhaustion dyeing method to obtain a dyed product in a bluish red color excellent in light fastness, perspiration-light fastness, perspiration fastness and others with high exhaustion and fixation percentages and superior build-up property.

Moreover, the anthraquinone compound can exhibit characteristics of high robustness so that the dyeing properties can hardly be affected by some changes in dyebath conditions such as dyeing temperatures, bath ratios, salt concentrations and the like.

EXAMPLE 2

Example 1 was repeated, provided that the compounds shown in 1st, 2nd and 3rd column of the following table were used in place of 1-amino-2-(3'-amino-4'-sulfophenoxy)-4-(4'-sulfophenylthio)anthraquinone, cyanuric chloride and 1-aminobenzene-3-β-sulfatoethylsulfone, respectively, thereby obtaining a corresponding anthraquinone compound. A color shade obtained by dyeing cotton with the compound is as shown in a 4th column of the table.

TABLE

| Run No. | 1st | 2nd | 3rd | 4th |
|---|---|---|---|---|
| 1 | [anthraquinone derivative with NH₂, SO₃H, O-phenyl-SO₃H, S-phenyl substituents] | cyanuric chloride (triazine with 3 Cl) | H₂N–C₆H₄–SO₂CH=CH₂ (para) | Bluish red |
| 2 | " | " | HO₃S–C₆H₃(NH₂)–SO₂C₂H₄OSO₃H | " |
| 3 | " | " | H₂N–C₆H₄–SO₂C₂H₄OSO₃H (para) | " |
| 4 | " | " | H₂N–C₆H₄–SO₂CH=CH₂ (meta) | " |
| 5 | [anthraquinone derivative with NH₂, SO₃H, O-phenyl-SO₃H, S-phenyl substituents] | cyanuric chloride (triazine with 3 Cl) | C₂H₅HN–C₆H₄–SO₂C₂H₄OSO₃H (meta) | Bluish red |

TABLE-continued

| Run No. | 1st | 2nd | 3rd | 4th |
|---|---|---|---|---|
| 6 | (anthraquinone structure with NH₂, O-phenyl-NH₂/SO₃H, S-phenyl-SO₃H) | " | 4-(C₂H₅)NH-C₆H₄-SO₂C₂H₄OSO₃H | " |
| 7 | " | " | 3-(C₂H₅)NH-C₆H₄-SO₂C₂H₄OSO₃H | " |
| 8 | " | cyanuric chloride | 2-amino-8-SO₃H-6-SO₂C₂H₄OSO₃H-naphthalene | " |
| 9 | (anthraquinone structure as above) | " | 2-amino-5-SO₂C₂H₄OSO₃H-8-SO₃H naphthalene | Bluish red |
| 10 | " | " | 2-amino-8-SO₃H-6-SO₂C₂H₄OSO₃H-naphthalene | " |

TABLE-continued

| Run No. | 1st | 2nd | 3rd | 4th |
|---|---|---|---|---|
| 11 | 1-amino-2-(4-sulfophenoxy)-4-(4-amino-3-sulfophenylthio)anthraquinone | " | 2-amino-4-(β-sulfatoethylsulfonyl)benzoic acid | " |
| 12 | " | cyanuric chloride (2,4,6-trichloro-1,3,5-triazine) | 6-amino-2-(β-sulfatoethylsulfonyl)naphthalene | Bluish red |
| 13 | 1-methylamino-2-(4-sulfophenoxy)-4-(3-amino-4-sulfophenylthio)anthraquinone | " | 2-amino-4-(β-sulfatoethylsulfonyl)anisole | " |
| 14 | 1-acetylamino-2-(4-sulfophenoxy)-4-(3-amino-4-sulfophenylthio)anthraquinone | " | 2-methyl-4-(β-sulfatoethylsulfonyl)-5-methoxyaniline | Red |
| 15 | 1-methylsulfonylamino-2-(4-sulfophenoxy)-4-(3-amino-4-sulfophenylthio)anthraquinone | " | 4-(β-sulfatoethylsulfonyl)aniline | " |

TABLE-continued

| Run No. | 1st | 2nd | 3rd | 4th |
|---|---|---|---|---|
| 16 | anthraquinone with NH-C₆H₄-SO₃H, OC₂H₅, S-C₆H₃(NH₂)(SO₃H) substituents | | 4-C₂H₅NH-C₆H₄-SO₂C₂H₄OSO₃H | Bluish red |
| 17 | anthraquinone with NHCO-C₆H₅, OC₂H₄OSO₃H, S-C₆H₃(NH₂)(SO₃H) substituents | cyanuric chloride (2,4,6-trichloro-1,3,5-triazine) | 4-H₂N-C₆H₄-SO₂C₂H₄OSO₃H | Red |
| 18 | anthraquinone with NHSO₂-C₆H₄-CH₃, OCH(CH₃)₂, S-C₆H₃(NH₂)(SO₃H) substituents | " | 3-CH₃NH-C₆H₄-SO₂C₂H₄OSO₃H | " |

TABLE-continued

| Run No. | 1st | 2nd | 3rd | 4th |
|---|---|---|---|---|
| 19 | (anthraquinone structure with NH2, O-cyclohexyl, NH2, SO3H, S, SO3H) | ″ | H2N–C6H4–SO2CH2CH2Cl (para) | Bluish red |
| 20 | (anthraquinone structure with NH2, O-(3-methylcyclohexyl), NH2, SO3H, S, SO3H) | (cyanuric chloride: triazine with 3 Cl) | Cl–C6H3(NH2)–SO2C2H4OSO3H | ″ |
| 21 | (anthraquinone structure with NH2, O-(gem-dimethylcyclohexyl), NH2, SO3H, S, SO3H) | ″ | C2H4OH–N(H)–C6H4–SO2C2H4OSO3H (meta) | Bluish red |
| 22 | (anthraquinone structure with NH2, OC2H4COOH, NH2, SO3H, S, SO3H) | ″ | C2H4COOH–N(H)–C6H4–SO2C2H4OSO3H (meta) | ″ |

TABLE-continued
| Run No. | 1st | 2nd | 3rd | 4th |
|---|---|---|---|---|
| 23 | 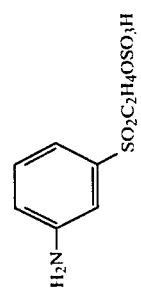 | " | 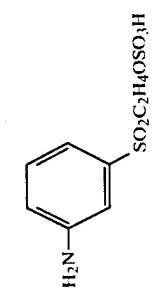 | " |
| 24 | 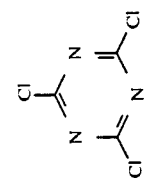 | " | 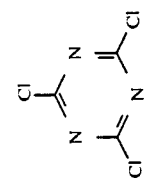 | " |
| 25 | 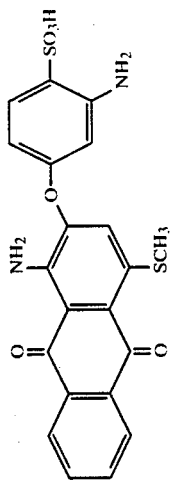 | 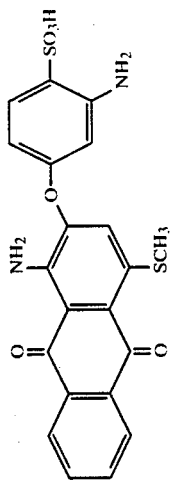 | 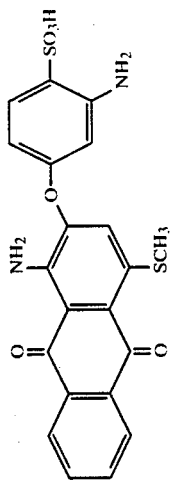 | Bluish red |
| 26 | 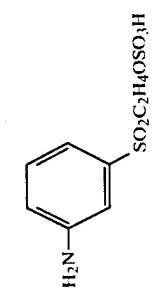 | " | 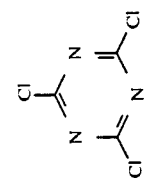 | " |

TABLE-continued

| Run No. | 1st | 2nd | 3rd | 4th |
|---|---|---|---|---|
| 27 | 1-NH₂, 4-SC₂H₅, 2-O-(phenyl with 4-SO₃H, 3-NH₂) anthraquinone | " | 4-H₂N-C₆H₄-SO₂C₂H₄OSO₃H | " |
| 28 | 1-NH₂, 4-SC₂H₄OSO₃H, 2-O-(phenyl with 4-NH₂, 3-SO₃H) anthraquinone | | 2-OCH₃, 4-H₂N-C₆H₃-SO₂C₂H₄OSO₃H | " |
| 29 | 1-NH₂, 4-SC₂H₄OSO₃H, 2-O-(phenyl with 4-SO₃H, 3-NH₂) anthraquinone | cyanuric chloride | 2-OCH₃, 4-H₂N-C₆H₃-SO₂C₂H₄OSO₃H | Bluish red |
| 30 | 1-NH₂, 4-S-C₂H₄COOH, 2-O-(phenyl with 2-SO₃H, 4-NH₂) anthraquinone | | 3-(C₂H₄CN)(C₂H₅)N-C₆H₄-SO₂C₂H₄OSO₃H | " |
| 31 | 1-NH₂, 4-S-cyclohexyl, 2-O-(phenyl with 2-SO₃H, 4-NH₂) anthraquinone | cyanuric chloride | 3-(C₂H₅)(C₂H₅)N-C₆H₄-SO₂C₂H₄OSO₃H | " |

TABLE-continued

| Run No. | 1st | 2nd | 3rd | 4th |
|---|---|---|---|---|
| 32 | anthraquinone derivative with NH₂, O-phenyl(SO₃H), NH₂, S-CH₂-phenyl(SO₃H) substituents | " | aniline with C₂H₄CONH₂ on NH and SO₂C₂H₄OSO₃H | " |
| 33 | anthraquinone derivative with NH₂, O-phenyl(SO₃H), SC₂H₄NH₂ substituents | cyanuric chloride (triazine with 3 Cl) | 3-aminophenyl-SO₂C₂H₄OSO₃H | Bluish red |
| 34 | anthraquinone derivative with NH₂, O-phenyl(SO₃H)₂, S-C₃H₆-NH₂ substituents | " | | " |
| 35 | anthraquinone derivative with NH₂, O-biphenyl(SO₃H)₂(NH₂), S-cyclohexyl substituents | " | | " |

TABLE-continued

| Run No. | 1st | 2nd | 3rd | 4th |
|---|---|---|---|---|
| 36 | (anthraquinone with NH2, O-biphenyl-SO3H/NH2, S–CH(CH3)2) | cyanuric chloride | | " |
| 37 | (anthraquinone with NH2, O-Ar-NH-Ar-SO3H/NH2, S–CH2COOH) | cyanuric chloride | 4-aminophenyl-SO2C2H4OSO3H | Bluish red |
| 38 | (anthraquinone with NH2, O-cyclohexyl, S-Ar-NH-Ar-NH2/SO3H) | " | 2-OCH3-5-CH3-4-amino-phenyl-SO2C2H4OSO3H | " |
| 39 | (anthraquinone with NH2, O-methylcyclohexyl, S-Ar-SO3H/NH2) | " | 3-(N-ethylamino)phenyl-SO2C2H4OSO3H | " |

TABLE-continued

| Run No. | 1st | 2nd | 3rd | 4th |
|---|---|---|---|---|
| 40 | anthraquinone derivative with NHCH(CH₃)₂, OC₂H₅, SO₃H, S-linked phenyl with SO₃H, NH₂ | " | " | Red |
| 41 | anthraquinone derivative with NHC₂H₄OCH₃, OC₂H₄OSO₃H, S-linked phenyl with NH₂, SO₃H | cyanuric chloride (triazine with Cl, Cl, Cl) | 3-H₂N-C₆H₄-SO₂C₂H₄OSO₃H | Bluish red |
| 42 | anthraquinone derivative with NHC₂H₄COOH, OC₂H₅, S-linked phenyl with SO₃H, NH₂ | " | " | " |
| 43 | anthraquinone derivative with NHC₂H₄OSO₃H, OC₂H₄COOH, S-linked phenyl with SO₃H, NH₂ | " | 4-H₂N-C₆H₄-SO₂C₂H₄OSO₃H | " |

TABLE-continued

| Run No. | 1st | 2nd | 3rd | 4th |
|---|---|---|---|---|
| 44 | anthraquinone derivative with NH-cyclohexyl, OCH₃, S-C₆H₃(SO₃H)(NH₂) substituents | cyanuric chloride (2,4,6-trichloro-1,3,5-triazine) | 4-H₂N-C₆H₄-SO₂C₂H₄OSO₃H | Red |
| 45 | anthraquinone derivative with NHC₂H₅, OCH(CH₃)₂, S-C₆H₃(NH₂)(SO₃H) substituents | " | " | Bluish red |

EXAMPLE 3

1-Amino-2-(3'-amino-4'-sulfophenoxy)-4-(4'-sulfophenylthio)anthraquinone (6 parts), cyanuric chloride (1.8 parts) and 1-aminobenzene-4-β-sulfatoethylsulfone (2.8 parts) were subjected to condensation reactions one after another in an aqueous medium in a conventional manner, followed by successive condensation reaction with 3-aminobenzenesulfonic acid (1.7 parts) at 50° to 70° C. under a weak acid condition. Thereafter, salting out of the reaction mixture gave an anthraquinone compound of following formula (free acid form).

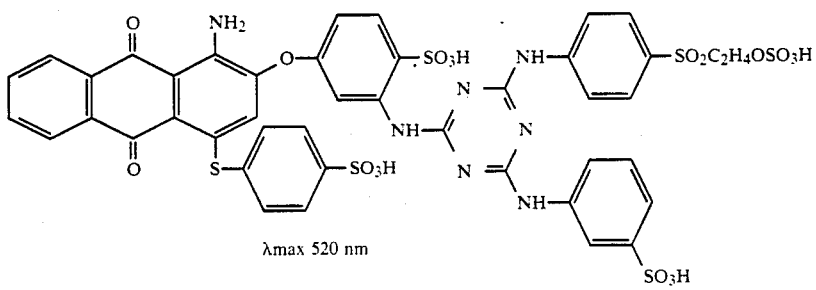

λmax 520 nm

The anthraquinone compound can be used for dyeing cotton to give a dyed product of a bluish red color excellent in light fastness, perspiration-light fastness, perspiration fastness and the like with high exhaustion and fixation percentages and superior build-up property.

Moreover, the anthraquinone compound can be characterized by high robustness so that the dyeing properties can hardly be affected even by some changes in dyeing conditions such as temperatures, bath ratios, salt concentrations and the like.

EXAMPLE 4

Example 3 was repeated, provided that the compounds shown in 1st, 2nd and 3rd columns of the following table were used in place of the 1-amino-2-(3'-amino-4'-sulfophenoxy)-4-(4'-sulfophenylthio)anthraquinone, 1-aminobenzene-4-β-sulfatoethylsulfone and 3-aminobenzenesulfonic acid respectively, thereby obtaining a corresponding anthraquinone. The color shade obtained by dyeing cotton with the anthraquinone compound is as shown in a 4th column of the table. Each compound can exhibit superior dye performances as described hereinabove.

TABLE

| Run No. | 1st | 2nd | 3rd | 4th |
|---|---|---|---|---|
| 1 | 1-amino-2-(4-sulfophenoxy)-4-(4-sulfophenylthio)anthraquinone | 3-aminophenyl-SO₂C₂H₄OSO₃H | 4-aminophenyl-SO₃H | Bluish red |
| 2 | " | N-ethylaniline | 3-aminophenyl-SO₂C₂H₄OSO₃H | " |
| 3 | " | 4-chloro-N-ethylaniline | " | " |
| 4 | " | 4-aminophenyl-SO₂C₂H₄OSO₃H | aniline | " |
| 5 | 1-amino-2-(4-sulfophenoxy)-4-(4-sulfophenylthio)anthraquinone | 4-aminophenyl-SO₂C₂H₄OSO₃H | 4-aminophenyl-SO₃H | Bluish red |
| 6 | " | 3-aminophenyl-SO₂C₂H₄OSO₃H | 3-aminophenyl-SO₃H | " |

TABLE-continued

| Run No. | 1st | 2nd | 3rd | 4th |
|---|---|---|---|---|
| 7 | " | " | 4-Cl-C6H4-NH2 | " |
| 8 | " | " | H2NC2H5 | " |
| 9 | Anthraquinone structure with NH2, O-C6H4-SO3H, S-C6H4-SO3H | 3-(H2N)-C6H4-SO2C2H4OSO3H | 3-(H2N)-C6H4-CH3 | Bluish red |
| 10 | " | " | 4-(H2N)-C6H4-COOH | " |
| 11 | Anthraquinone structure with NH2, O-C6H3(NH2)(SO3H), S-C6H4-SO3H | 4-(H2N)-C6H4-SO2C2H4OSO3H | 3-(H2N)-C6H4-SO2C2H4OSO3H | " |
| 12 | " | " | 4-(H2N)-C6H4-SO2C2H4OSO3H | " |

TABLE-continued

| Run No. | 1st | 2nd | 3rd | 4th |
|---|---|---|---|---|
| 13 | anthraquinone with NH₂, O-C₆H₄-SO₃H, S-C₆H₄(NH₂)(SO₃H) | 3-(C₂H₅NH)-C₆H₄-SO₂C₂H₄OSO₃H | 3-(H₂N)-C₆H₄-SO₂C₂H₄OSO₃H | Bluish red |
| 14 | anthraquinone with NH₂, O-C₆H₃(NH₂), S-C₆H₄-SO₃H | 4-(C₂H₅NH)-C₆H₄-SO₂C₂H₄OSO₃H | 4-(H₂N)-2-(OCH₃)-C₆H₃-SO₃C₂H₄OSO₃H | " |
| 15 | " | 4-(H₂N)-2-(OCH₃)-5-(CH₃)-C₆H₂-SO₂C₂H₄OSO₃H | 3-(H₂N)-C₆H₄-SO₂C₂H₄OSO₃H | 41 |
| 16 | " | C₆H₅-NH-CH₃ | " | " |
| 17 | anthraquinone with NH₂, O-C₆H₃(NH₂)(SO₃H), S-C₆H₄-SO₃H | 2-Cl-C₆H₄-NH₂ | 3-(H₂N)-C₆H₄-SO₂C₂H₄OSO₃H | Bluish red |

TABLE-continued
| Run No. | 1st | 2nd | 3rd | 4th |
|---|---|---|---|---|
| 18 |  |  | " | " |
| 19 | 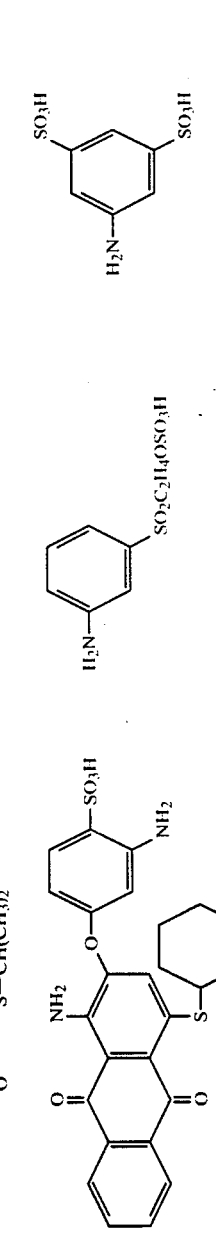 | 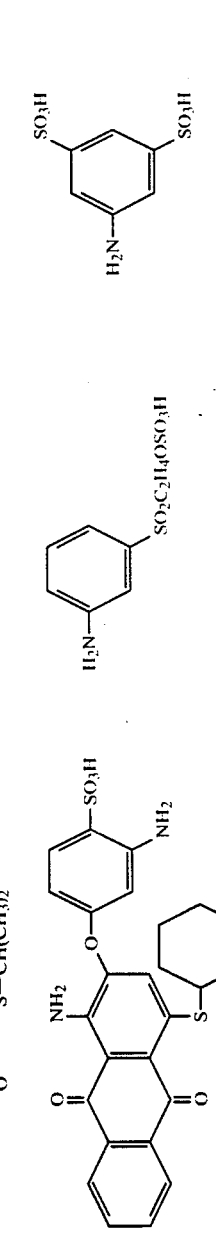 | 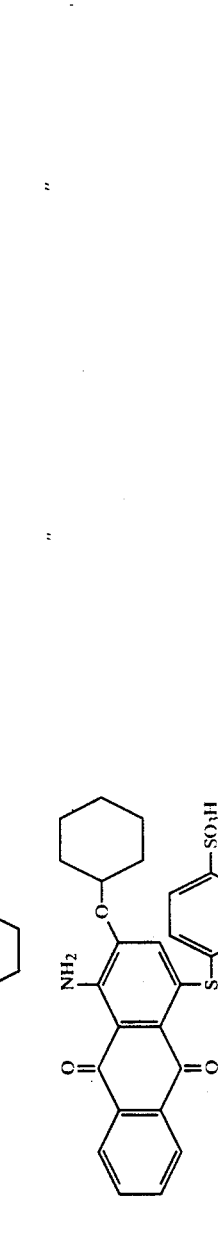 | " |
| 20 | 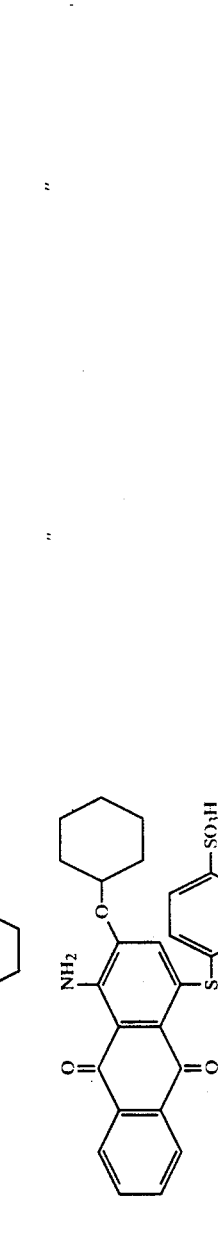 | " | " | " |
| 21 | 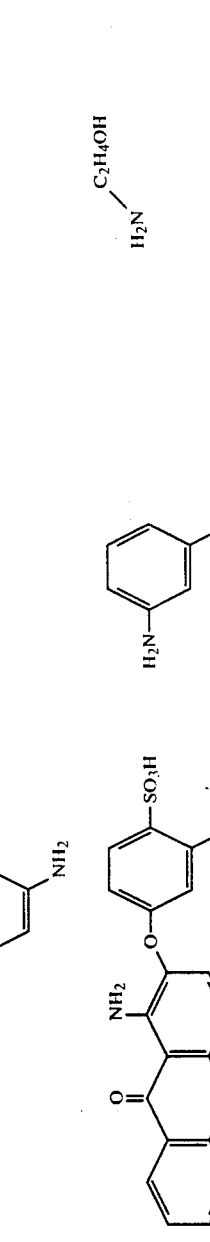 | 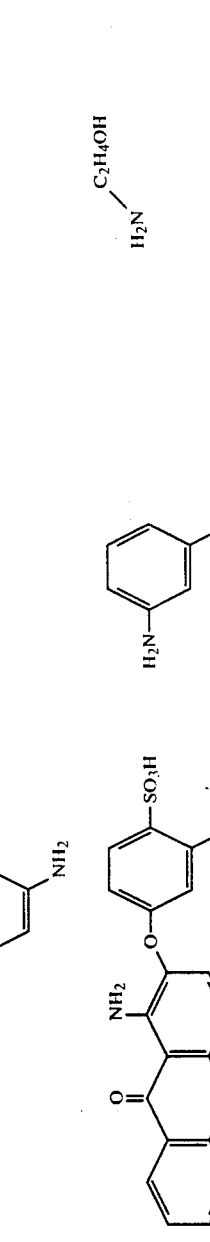 | 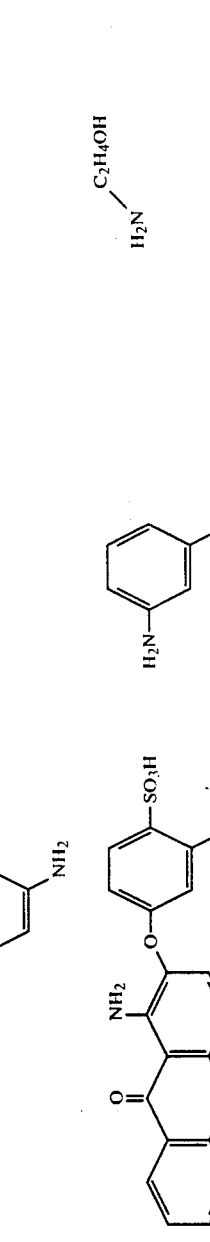 | Bluish red |
| 22 |  |  | 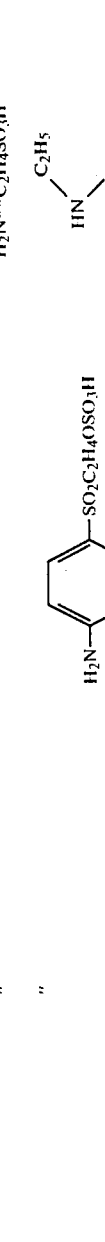 | " |
| 23 | " | 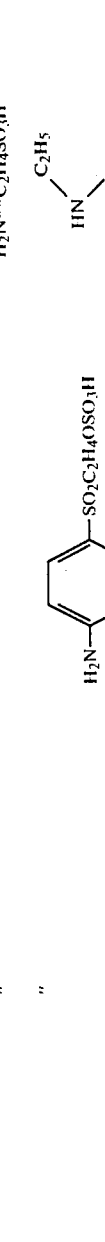 | " | " |

TABLE-continued

| Run No. | 1st | 2nd | 3rd | 4th |
|---|---|---|---|---|
| 24 | [anthraquinone structure with NH₂, O-C₆H₄-SO₃H, S-C₆H₃(NH₂)(SO₃H) substituents] | " | HN(C₂H₄OH)(C₂H₄OH) | " |
| 25 | " | " | HN(C₂H₄OCH₃)(C₂H₅) | " |

EXAMPLE 5

1-Amino-2-(3'-amino-4'-sulfophenoxy)-4-(4'-sulfophenylthio)anthraquinone (6 parts) and cyanuric chloride (1.8 parts) were subjected to condensation reaction at 5° to 30° C. under a weak acid condition in an aqueous medium, and then salting out of the reaction mixture gave an anthraquinone compound of the following formula (free acid form).

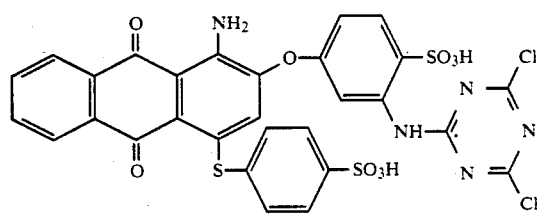

λmax 520 nm

The above compound can be used for dyeing cotton to give a dyed product of a bluish red color excellent in fastness properties such as light fastness, perspiration-light fastness, perspiration fastness and the like with high exhausation and fixation percentages and superior build-up property.

EXAMPLE 6

Example 5 was repeated, provided that the compounds shown in 1st and 2nd columns of the following table were used in place of 1-amino-2-(3'-amino-4'-sulfophenoxy)-4-(4'-sulfophenylthio)anthraquinone and cyanuric chloride, respectively, thereby obtaining a corresponding anthraquinone compound. A color shade obtained by dyeing cotton with the compound is as shown in a 3rd column of the table. Each compound can exhibit superior dye performances as described hereinabove.

TABLE

| Run No. | 1st | 2nd | 3rd |
|---|---|---|---|
| 1 | [anthraquinone structure with NH₂, O-phenyl-NH₂/SO₃H, S-phenyl-SO₃H] | [cyanuric chloride structure] | Bluish red |
| 2 | [anthraquinone structure with NH₂, O-phenyl-SO₃H/NH₂, S-phenyl-SO₃H] | [triazine-like structure with Cl, SO₂CH₃, CH₃] | " |
| 3 | " | [structure with F, Cl, F, N] | " |
| 4 | " | [structure with F, Cl, F, CH₃, N] | " |
| 5 | [anthraquinone structure with NH₂, O-phenyl-SO₃H/NH₂, S-phenyl-SO₃H] | [structure with Cl, Cl, Cl, Cl, N] | Bluish red |

TABLE-continued

| Run No. | 1st | 2nd | 3rd |
|---|---|---|---|
| 6 | 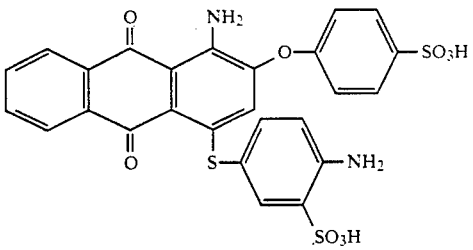 | 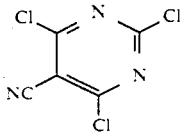 | " |
| 7 | " | 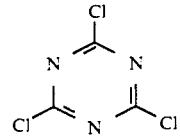 | " |
| 8 | 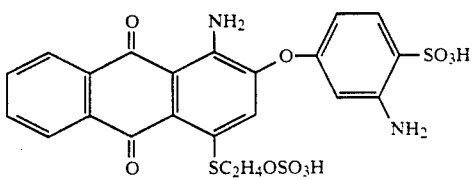 | " | " |
| 9 | 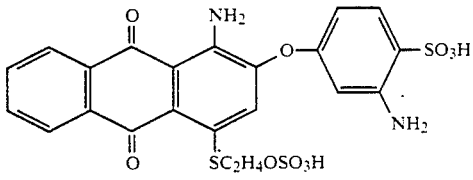 | 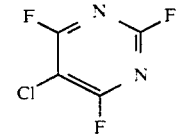 | Bluish red |
| 10 | 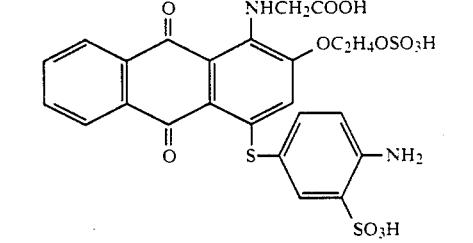 | " | " |

EXAMPLE 7

1-Amino-2-bromo-4-phenylthioanthraquinone (4.1 parts) and 3-β-hydroxyethylsulfonylphenol (2.1 parts) were allowed to react with each other at 100 to 120° C. in dimethylformamide in the presence of potassium carbonate. After completion of the reaction, methanol was added to the reaction mixture to deposit crystals, which were then collected on a filter, well washed with water and then dried at 80° C. The product obtained was subjected to both sulfonation and esterification at 20° to 40° C. in 10% oleum. Ice was added to the reaction mixture to deposit crystals, which were then collected on a filter to obtain an anthraquinone compound of the following formula (free acid form).

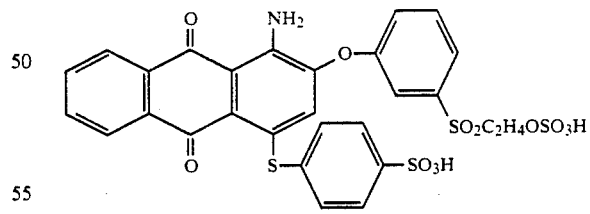

λmax 520 nm

The above compound can be used for dyeing cotton to obtain a dyed product of a bluish red excellent in fastness properties such as light fastness, perspiration-light fastness, perspiration fastness and the like with high exhaustion and fixation percentages and superior build-up property.

EXAMPLE 8

Example 7 was repeated, provided that the compounds shown in 1st and 2nd columns of the following table were used in place of 1-amino-2-bromo-4-phenyl-thioanthraquinone and 3-β-hydroxyethylsulfonyl-phenol, respectively, thereby obtaining a corresponding anthraquinone compound. The color shade obtained by dyeing cotton with the compound is as shown in a 3rd column of the above. Each compound can exhibit superior dye performances as described hereinabove.

TABLE

| Run No. | 1st | 2nd | 3rd |
|---|---|---|---|
| 1 | 1-amino-2-bromo-4-phenylthio-anthraquinone | HO—C$_6$H$_4$—SO$_2$C$_2$H$_4$OH | Bluish red |
| 2 | " | 4-methoxy-3-hydroxy-phenyl-SO$_2$C$_2$H$_4$OH | " |
| 3 | " | 4-hydroxy-3-methoxy-phenyl-SO$_2$C$_2$H$_4$OH | " |
| 4 | " | 5-methoxy-4-hydroxy-2-methyl-phenyl-SO$_2$C$_2$H$_4$OH | " |
| 5 | 1-amino-2-bromo-4-phenylthio-anthraquinone | HO—C$_6$H$_4$—O—C$_6$H$_4$—SO$_2$C$_2$H$_4$OH | Bluish red |
| 6 | " | HO—C$_6$H$_4$—CONH—C$_6$H$_4$—SO$_2$C$_2$H$_4$OH | " |
| 7 | " | (4-hydroxy-2-sulfo)phenyl-NH—C$_6$H$_4$—SO$_2$C$_2$H$_4$OH | " |
| 8 | " | (4-hydroxy-2-sulfo)phenyl-NHCO—C$_6$H$_4$—SO$_2$C$_2$H$_4$OH | " |

TABLE-continued

| Run No. | 1st | 2nd | 3rd |
|---|---|---|---|
| 9 | 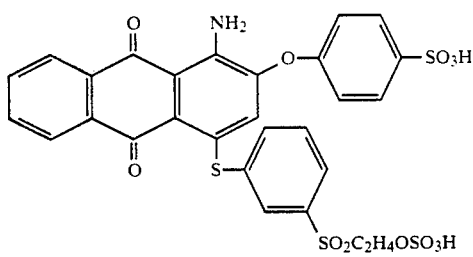 | HOC$_2$H$_4$O—⟨phenyl⟩—SO$_2$C$_2$H$_4$OH | " |
| 10 | anthraquinone with NH$_2$, Br, S-phenyl substituents | HO—⟨phenyl⟩—SO$_2$C$_2$H$_4$OH | Bluish red |

EXAMPLE 9

1-Amino-2-bromo-4-(3'-β-hydroxyethylsulfonylphenylthio)anthraquinone (5.2 parts) and phenol (9.5 parts) were allowed to react with each other at 100° to 120° C. in dimethylformamide in the presence of potassium carbonate. After completion of the reaction methanol was added thereto to deposit crystals, which were collected on a filter, well washed with water and then dried at 80° C. The product obtained was subjected to both sulfonation and esterification at 20° to 40° C. in 10% oleum. Thereafter, ice was added to the reaction mixture to deposit crystals, which were collected on a filter to obtain an anthraquinone compound of the following formula (free acid form).

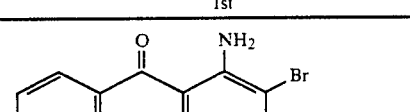

λmax 520 nm

The compound obtained can be used for dyeing cotton to obtain a dyed product of a bluish red color excellent in fastness properties such as light fastness, perspiration-light fastness, perspiration fastness and the like with high exhaustion and fixation percentages and superior build-up property.

EXAMPLE 10

Example 9 was repeated, provided that the compounds shown in 1st and 2nd columns of the following above was used in place of the 1-amino-2-bromo-4-(3'-β-hydroxyethylsulfonylphenolthio)anthraquinone and phenol, respectively, thereby obtaining a corresponding anthraquinone compound. The color shade obtained by dyeing cotton with the compound is as shown in 3rd column of the table. Each compound can exhibit superior dye performances as described hereinabove.

TABLE

| Run No. | 1st | 2nd | 3rd |
|---|---|---|---|
| 1 | 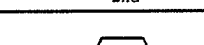 | HO—⟨phenyl⟩—CH$_3$ | Bluish red |

TABLE-continued

| Run No. | 1st | 2nd | 3rd |
|---|---|---|---|
| 2 | " | 4-hydroxyphenyl phenyl ether (HO-C6H4-O-C6H5) | " |
| 3 | " | 3-methoxyphenol (HO-C6H4-OCH3) | " |
| 4 | 1-amino-2-bromo-4-(4-(2-hydroxyethylsulfonyl)phenylthio)anthraquinone | phenol (HO-C6H5) | " |
| 5 | 1-amino-2-bromo-4-(4-(2-hydroxyethylsulfonyl)phenylthio)anthraquinone | 4-hydroxydiphenylamine (HO-C6H4-NH-C6H5) | Bluish red |
| 6 | 1-cyclohexylamino-2-bromo-4-[4-(4-(2-hydroxyethylsulfonyl)phenylamino)phenylthio]anthraquinone | 2-phenoxyethanol (HOC2H4O-C6H5) | " |
| 7 | 1-(2-hydroxyethylamino)-2-chloro-4-(4-(2-hydroxyethylsulfonyl)phenylthio)anthraquinone | " | " |
| 8 | 1-amino-2-chloro-4-(4-(2-hydroxyethylsulfonyl)phenylthio)anthraquinone | 3-chlorophenol (HO-C6H4-Cl) | " |

TABLE-continued

| Run No. | 1st | 2nd | 3rd |
|---|---|---|---|
| 9 | 1-amino-2-chloro-4-(4-(2-hydroxyethylsulfonyl)phenylthio)anthraquinone structure | HS-C6H5 (thiophenol) | Bluish red |
| 10 | 1-amino-2-bromo-4-[4-(3-(2-hydroxyethylsulfonyl)phenylcarbamoyl)phenylthio]anthraquinone structure | HO-C6H5 (phenol) | " |

EXAMPLE 11

1-Amino-2-(3'-amino-4'-sulfophenoxy)-4-(4'-sulfophenylthio)anthraquinone (6 parts) and cyanuric chloride (1.8 parts) were subjected to condensation reaction in an aqueous medium in a conventional manner, followed by condensation reaction with 3-aminobenzenesulfonic acid (1.7 parts) at 20° to 40° C. under a weak acid condition. Thereafter, salting out of the reaction mixture with sodium chloride gave an anthraquinone compound of the following formula (free acid form).

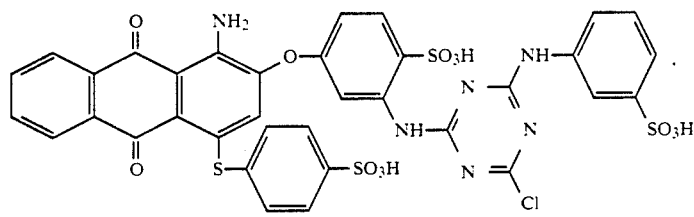

$\lambda$max 520 nm

The anthraquinone compound can be used for dyeing fiber materials, particularly those such as cotton in the manner as described hereinabove, such as, for example, by the exhaustion dyeing method, to obtain a dyed product of a bluish red color excellent in fastness properties such as light fastness, perspiration-light fastness, perspiration fastness and the like with high exhaustion and fixation percentages and superior build-up property.

EXAMPLE 12

Example 11 was repeated, provided that the shown in 1st, 2nd and 3rd columns of the following table were used in place of the 1-amino-2-(3'-amino-4'-sulfophenoxy)-4-(4'-sulfophenylthio)anthraquinone, cyanuric chloride and 3-aminobenzenesulfonic acid, respectively, thereby obtaining a corresponding anthraquinone compound. The color shade obtained by dyeing cotton with the compound is as shown in a 4th column of the table.

TABLE

| Run No. | 1st | 2nd | 3rd | 4th |
|---|---|---|---|---|
| 1 | 1-amino-2-(3-amino-4-sulfophenoxy)-4-(4-sulfophenylthio)anthraquinone structure | cyanuric chloride | 2,5-diaminobenzenesulfonic acid | Bluish red |

| Run No. | 1st | 2nd | 3rd | 4th |
|---|---|---|---|---|
| 2 | " | 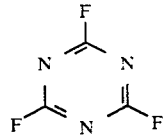 | 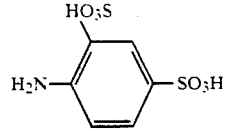 HO₃S, H₂N–C₆H₃–SO₃H | " |
| 3 | " | 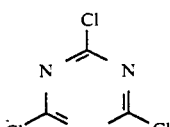 | 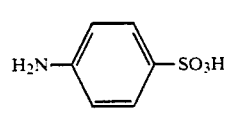 H₂N–C₆H₄–SO₃H | " |
| 4 | " | " | 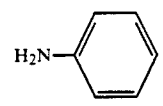 H₂N–C₆H₅ | " |
| 5 | 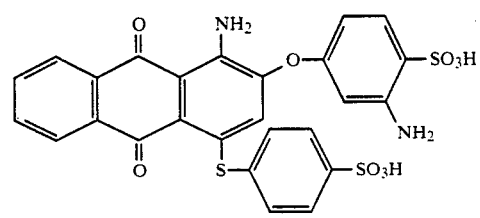 | 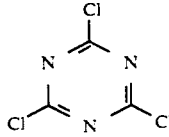 | NH₃ | Bluish red |
| 6 | " | " | H₂N—C₂H₄SO₃H | " |
| 7 | " | " | H₂N—C₂H₄COOH | " |
| 8 | " | " |  | " |
| 9 | 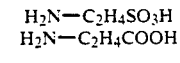 | 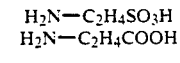 | 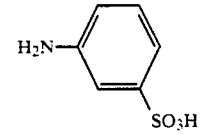 | Bluish red |
| 10 | " | " | 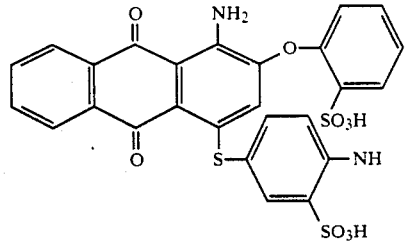 | " |
| 11 | 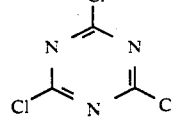 | " | 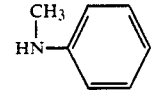 | " |
| 12 | " | " | 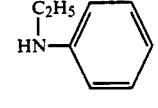 | " |

TABLE-continued

| Run No. | 1st | 2nd | 3rd | 4th |
|---|---|---|---|---|
| 13 | 1-amino-2-(3-amino-4-sulfophenoxy)-4-(4-sulfophenylthio)anthraquinone | 2,4,6-trifluoro-1,3,5-triazine | 4-aminobenzoic acid | Bluish red |
| 14 | " | 2,4,6-trichloro-1,3,5-triazine (with CF) | N-ethyl-4-chloroaniline | " |
| 15 | " | " | 4-methoxyaniline | " |
| 16 | " | " | 6-amino-2-naphthalenesulfonic acid | " |
| 17 | 1-amino-2-(3-amino-4-sulfophenoxy)-4-(4-sulfophenylthio)anthraquinone | 2,4,6-trichloro-1,3,5-triazine | $H_2N-C_3H_7$ | Bluish red |
| 18 | 1-amino-2-(4-sulfophenoxy)-4-(4-amino-2-sulfophenylthio)anthraquinone | " | 7-amino-naphthalene-1-sulfonic acid | " |
| 19 | " | " | benzylamine | " |
| 20 | " | " | 4-ethylaniline | " |
| 21 | 1-amino-2-(3-amino-4-sulfophenoxy)-4-(4-sulfophenylthio)anthraquinone | 2,4,6-trichloro-1,3,5-triazine | $H_2N-C_6H_4-CONHC_2H_4SO_2C_2H_4Cl$ | Bluish red |

TABLE-continued

| Run No. | 1st | 2nd | 3rd | 4th |
|---|---|---|---|---|
| 22 | (anthraquinone with NH₂, O-C₆H₄-SO₃H, S-C₆H₃(NH₂)(SO₃H)) | " | " | " |
| 23 | (anthraquinone with NH₂, O-C₆H₃(NH₂)-SO₃H, SCH₃) | cyanuric fluoride | m-aminobenzenesulfonic acid | " |
| 24 | (anthraquinone with NH₂, O-C₆H₃(NH₂)-SO₃H, SC₂H₅) | cyanuric chloride | 2-amino-1,4-benzenedisulfonic acid | " |
| 25 | (anthraquinone with NH₂, O-C₆H₃(NH₂)(SO₃H), SC₂H₄OSO₃H) | cyanuric chloride | HN(C₂H₅)₂ | Bluish red |
| 26 | (anthraquinone with NH₂, S-C₆H₄-SO₃H, O-C₆H₃(NH₂)-SO₃H) | " | m-aminobenzenesulfonic acid | Yellowish red |
| 27 | (anthraquinone with NH₂, S-C₆H₄-SO₃H, O-C₆H₃(NH₂)(SO₃H)) | " | " | " |

TABLE-continued

| Run No. | 1st | 2nd | 3rd | 4th |
|---|---|---|---|---|
| 28 | (anthraquinone with NH₂, S-phenyl(SO₃H)(NH₂), OC₆H₁₁) | " | H₂N-phenyl(SO₃H)(SO₃H) | " |
| 29 | (anthraquinone with NH₂, S-phenyl(SO₃H)(NH₂), OCH(CH₃)₂) | cyanuric chloride | H₂N-phenyl(SO₃H)(SO₃H) | Yellowish red |
| 30 | (anthraquinone with NH₂, S-phenyl(SO₃H)(NH₂), OC₂H₄OSO₃H) | " | H₂N-phenyl(SO₃H) (meta) | " |

EXAMPLE 13

1-Amino-2-carboxy-4-(3′-amino-4′-sulfophenylthio)anthraquinone (9.4 parts) and cyanuric chloride (3.7 parts) were subjected to condensation reaction in an aqueous medium in a usual manner, followed by condensation reaction with 1-aminobenzene-3-β-sulfatoethylsulfone (5.6 parts) at 20° to 40° C. under a weak acid condition. Thereafter, salting out of the reaction mixture with sodium chloride gave an anthraquinone compound of the following formula (free acid form).

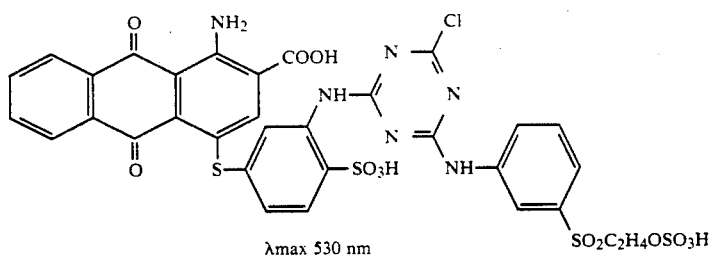

λmax 530 nm

The anthraquinone compound can be used for dyeing cellulose fiber materials, particularly those such as cotton in the manner described for example, by the exhaustion method, to give a dyed product of a bluish red color excellent in fastness properties such as light fastness, perspiration-light fastness, perspiration fastness and the like, with high exhaustion and fixation percentages and superior build up property.

Moreover, the anthraquinone compound is robust so that the dyeing properties cannot be affected by somewhat change in dyeing conditions such as temperatures, bath ratios, salt concentrations and the like.

EXAMPLE 14

Example 13 was repeated, provided that the compounds described in 1st, 2nd and 3rd columns of the following table were used in place of the 1-amino-2-carboxy-4-(3′-amino-4′-sulfophenylthio)anthraquinone, cyanuric chloride and 1-aminobenzene-3-β-sulfatoethylsulfone, respectively, thereby obtaining a corresponding anthraquinone compound. A color shade obtained by dyeing cotton with the anthraquinone compound is as shown in a 4th column of the table.

TABLE

| Run No. | 1st | 2nd | 3rd | 4th |
|---|---|---|---|---|
| 1 | Anthraquinone derivative with NHCH(CH₃)₂, COOH, S-linked phenyl-SO₃H, NH₂ | Cyanuric chloride (2,4,6-trichloro-1,3,5-triazine) | 4-H₂N-C₆H₄-SO₂C₂H₄OSO₃H | Bluish red |
| 2 | " | " | 3-H₂N-C₆H₄-SO₂C₂H₄OSO₃H | " |
| 3 | " | " | 3-(C₂H₅HN)-C₆H₄-SO₂C₂H₄OSO₃H | " |
| 4 | Anthraquinone derivative with NHC₂H₄OH, COOH, S-linked phenyl-SO₃H, NH₂ | " | 3-H₂N-C₆H₄-SO₂CH=CH₂ | " |

TABLE-continued

| Run No. | 1st | 2nd | 3rd | 4th |
|---|---|---|---|---|
| 5 | anthraquinone derivative with NHC₂H₄OH, COOH, SO₃H, NH₂, S-phenyl substituents | cyanuric chloride | 4-(C₂H₅NH)-phenyl-SO₂C₂H₄OSO₃H | Bluish red |
| 6 | anthraquinone derivative with NHC₂H₄COOH, SO₃H, NH₂, S-phenyl substituents | " | 3-NH₂-4-OCH₃-phenyl-SO₂C₂H₄OSO₃H | " |
| 7 | anthraquinone derivative with cyclohexyl-NH, SO₃H, NH₂, S-phenyl substituents | " | 3-(C₂H₅NH)-phenyl-SO₂C₂H₄OSO₃H | " |

TABLE-continued

| Run No. | 1st | 2nd | 3rd | 4th |
|---|---|---|---|---|
| 8 | cyclohexyl-NH-anthraquinone-S-biphenyl(SO₃H)(SO₃H)-NH₂ | cyanuric chloride | 4-amino-5-methoxy-2-methyl-benzene sulfonate ethyl sulfate (H₂N, OCH₃, CH₃, SO₂C₂H₄OSO₃H) | Bluish red |
| 9 | (CH₃)₂CHNH-anthraquinone-S-phenyl(SO₃H)-NH-phenyl(SO₃H)(NH₂) | " | 3-amino-phenyl-SO₂C₂H₄OSO₃H | " |
| 10 | (SO₃H-phenyl)-NH-anthraquinone-S-phenyl(SO₃H)-NHCO-phenyl(NH₂)(SO₃H) | " | " | " |

TABLE-continued

| Run No. | 1st | 2nd | 3rd | 4th |
|---|---|---|---|---|
| 11 | 1-NHCOCH₃, 4-S-(2-amino-4-sulfophenyl) anthraquinone | cyanuric chloride (2,4,6-trichloro-1,3,5-triazine) | 3-(N-(2-hydroxyethyl)amino)-phenyl-SO₂C₂H₄OSO₃H | Red |
| 12 | 1-NHCOC₆H₅, 4-S-(2-amino-4-sulfophenyl) anthraquinone | " | 3-(N-methylamino)phenyl-SO₂C₂H₄OSO₃H | " |
| 13 | 1-NHSO₂CH₃, 4-S-(2-amino-4-sulfophenyl) anthraquinone | " | 4-aminophenyl-SO₂C₂H₄OSO₃H | " |

| Run No. | 1st | 2nd | 3rd | 4th |
|---|---|---|---|---|
| 14 | anthraquinone with NHSO2-C6H4-CH3 and S-C6H3(SO3H)(NH2) substituents | cyanuric chloride (2,4,6-trichloro-1,3,5-triazine) | 2-amino-4-(SO2C2H4OSO3H)-phenol-SO3H | Red |
| 15 | anthraquinone with NHC2H5, SO3H and S-C6H3(SO3H)(NH2) substituents | " | 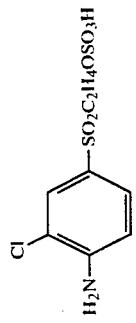 | Bluish red |
| 16 | naphthacenequinone with NH2, COOH and S-cyclohexyl-NH2 substituents | " | " | " |
| 17 | naphthacenequinone with NH2, COOH and S-cyclohexyl-NH2 substituents | " | 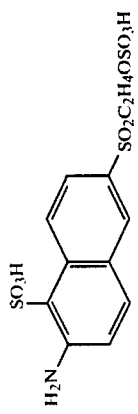 | " |

| Run No. | 1st | 2nd | 3rd | 4th |
|---|---|---|---|---|
| 18 | anthraquinone with NH₂, COOH, S-cyclohexyl-NH₂ substituents | cyanuric chloride (2,4,6-trichloro-1,3,5-triazine) | 1-SO₂C₂H₄OSO₃H, 5-SO₃H, 7-H₂N naphthalene | Bluish red |
| 19 | anthraquinone with NHC₂H₅, COOH, S-C₂H₄NH₂, SO₃H substituents | " | 1-SO₃H, 6-SO₂C₂H₄OSO₃H, 7-H₂N naphthalene | " |
| 20 | anthraquinone with NHCH₃, COOH, S-CH₂-C₆H₃(NH₂)(SO₃H) substituents | " | | " |
| 21 | anthraquinone with NH₂, Br, S-C₆H₃(SO₃H)(NH₂) substituents | " | 3-SO₂C₂H₄OSO₃H, 1-H₂N benzene | " |

TABLE-continued

| Run No. | 1st | 2nd | 3rd | 4th |
|---|---|---|---|---|
| 22 | 1-NH₂, 2-Br, 4-S-(2-SO₃H, 4-(4-NH₂, 3-SO₃H-phenoxy)phenyl) anthraquinone | cyanuric chloride (2,4,6-trichloro-1,3,5-triazine) | 3-aminophenyl-SO₂C₂H₄OSO₃H | Bluish red |
| 23 | 1-NH₂, 2-Cl, 4-S-(4-NH₂, 3-SO₃H-phenyl) anthraquinone | ″ | 4-amino-3-COOH-phenyl-SO₂C₂H₄OSO₃H | ″ |
| 24 | 1-NHCH(CH₃)₂, 2-Cl, 4-S-(2-SO₃H, 4-NH₂-phenyl) anthraquinone | ″ | 4-aminophenyl-SO₂C₂H₄OSO₃H | ″ |
| 25 | 1-NH₂, 2-CH₃, 4-S-(2-SO₃H, 4-NH₂-phenyl) anthraquinone | ″ | ″ | ″ |

EXAMPLE 15

1-Amino-2-bromo-4-(3'-amino-4'-sulfophenylthio)anthraquinone (10.1 parts), cyanuric chloride (3.7 parts) and 1-aminobenzene-4-β-sulfatoethylsulfone (5.6 parts) were subjected to condensation reactions one after another in an aqueous medium in a usual manner, followed by condensation reaction with 3-aminobenzenesulfonic acid (3.5 parts) at 50° to 70° C. under a weak acid condition. Thereafter, salting out of the reaction mixture gave an anthraquinone compound of the following formula (free aci form).

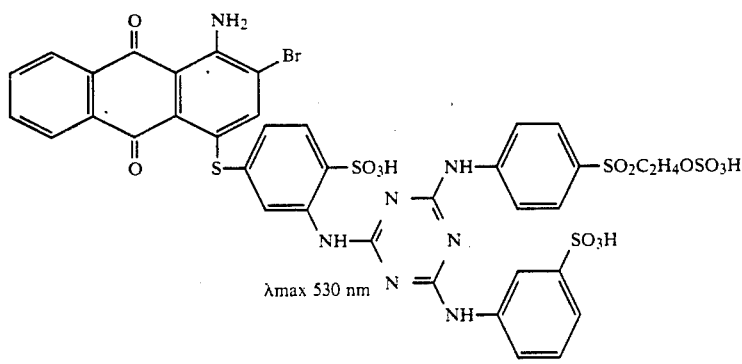

λmax 530 nm

The anthraquinone compound can be used for dyeing cellulose fiber materials, particularly those such as cotton in the manner described above for example, by the exhaustion method, to give a dyed product of a bluish red color excellent in fastness properties such as light fastness, perspiration-light fastness, perspiration fastness and the like, with high exhaustion and fixation percentage and superior build up property.

Moreover, the anthraquinone compound is robust so that the dyeing properties cannot be affected by somewhat changes in dyeing conditions such as temperatures, bath ratios, salt concentrations and the like.

EXAMPLE 16

Example 15 was repeated, provided that the compounds described in 1st, 2nd and 3rd columns of the following table were used in place of the 1-amino-2-bromo-4-(3'-amino-4'-sulfophenylthio)anthraquinone, 1-aminobenzene-4-β-sulfatoethylsulfone and 3-aminobenzenesulfonic acid, respectively, thereby obtaining a corresponding anthraquinone compound. A color shade obtained by dyeing cotton with the compound is as shown in a 4th column of the table.

TABLE

| Run No. | 1st | 2nd | 3rd | 4th |
|---|---|---|---|---|
| 1 | [anthraquinone with O, NHCH₂(CH₃)₂, COOH, and S—C₆H₃(SO₃H)(NH₂)] | H₂N—C₆H₄—SO₂C₂H₄OSO₃H | H₂N—C₆H₄—SO₃H | Bluish red |
| 2 | " | C₂H₅–HN—C₆H₅ | H₂N—C₆H₄—SO₂C₂H₄OSO₃H | " |
| 3 | " | C₂H₅–HN—C₆H₄—Cl | " | " |
| 4 | [anthraquinone with O, NH-cyclohexyl, O, and S—C₆H₃(SO₃H)(NH₂)] | H₂N—C₆H₃(SO₃H)(SO₃H) | " | " |

TABLE-continued

| Run No. | 1st | 2nd | 3rd | 4th |
|---|---|---|---|---|
| 5 | 1-cyclohexylamino-4-(3-amino-4-sulfophenylthio)anthraquinone | $H_2N$–C$_6$H$_4$–SO$_2$C$_2$H$_4$OSO$_3$H (para) | 3,5-disulfoaniline | Bluish red |
| 6 | 1-(n-butylamino)-4-(3-amino-4-sulfophenylthio)anthraquinone | " | 3-aminobenzenesulfonic acid | " |
| 7 | 1-amino-2-carboxy-4-(3-amino-4-sulfophenylthio)anthraquinone | " | 4-chloroaniline | " |
| 8 | " | $H_2N$–C$_6$H$_4$–SO$_2$C$_2$H$_4$OSO$_3$H (meta) | $H_2NC_2H_5$ | " |
| 9 | 1-amino-2-bromo-4-(3-amino-4-sulfophenylthio)anthraquinone | $H_2N$–C$_6$H$_4$–SO$_2$C$_2$H$_4$OSO$_3$H (meta) | 3-methylaniline | Bluish red |
| 10 | " | " | $H_2N$–C$_6$H$_4$–COOH (para) | " |
| 11 | 1-(2-methoxyethylamino)-4-(3-amino-4-sulfophenylthio)anthraquinone | $H_2N$–C$_6$H$_4$–SO$_2$C$_2$H$_4$OSO$_3$H (para) | $H_2N$–C$_6$H$_4$–SO$_2$C$_2$H$_4$OSO$_3$H (meta) | " |
| 12 | " | " | $H_2N$–C$_6$H$_4$–SO$_2$C$_2$H$_4$OSO$_3$H (para) | " |
| 13 | 1-(2-sulfatoethylamino)-4-(3-amino-4-sulfophenylthio)anthraquinone | 3-(N-ethylamino)phenyl-SO$_2$C$_2$H$_4$OSO$_3$H | $H_2N$–C$_6$H$_4$–SO$_2$C$_2$H$_4$OSO$_3$H (meta) | Bluish red |

TABLE-continued

| Run No. | 1st | 2nd | 3rd | 4th |
|---|---|---|---|---|
| 14 | 1-cyclohexylamino-4-(3-amino-4-sulfophenylthio)anthraquinone | 4-(N-ethyl-amino)phenyl-SO$_2$C$_2$H$_4$OSO$_3$H | 4-methoxy-3-aminophenyl-SO$_2$C$_2$H$_4$OSO$_3$H | " |
| 15 | " | 2-methoxy-4-(SO$_2$C$_2$H$_4$OSO$_3$H)aniline | 3-aminophenyl-SO$_2$C$_2$H$_4$OSO$_3$H | " |
| 16 | 1-ethylamino-2-carboxy-4-(3-amino-4-sulfophenylthio)anthraquinone | 2-chloroaniline | 3-aminophenyl-SO$_2$C$_2$H$_4$OSO$_3$H | " |
| 17 | 1-ethylamino-2-carboxy-4-(3-amino-4-sulfophenylthio)anthraquinone | 3-aminophenyl-SO$_2$C$_2$H$_4$OSO$_3$H | H$_2$N—C$_2$H$_4$OH | Bluish red |
| 18 | 1-amino-2-carboxy-4-(3-amino-4-sulfophenylthio)anthraquinone | " | H$_2$N—C$_2$H$_4$SO$_3$H | " |
| 19 | 1-amino-2-bromo-4-(3-aminopropylthio)-6-sulfo-anthraquinone | " | HN(C$_2$H$_5$)$_2$ | " |
| 20 | 1-amino-2-bromo-4-[2-(4-amino-2,5-disulfophenoxy)ethylthio]anthraquinone | " | HN(C$_2$H$_5$)(C$_2$H$_4$OCH$_3$) | " |

EXAMPLE 17

1-(2'-Sulfatoethylamino)-4-(3'-amino-4'-sulfophenylthio)anthraquinone (11.0 parts) and cyanuric chloride (3.7 parts) were subjected to condensation reaction at 5° to 30° C. in an aqueous medium under a weak acid condition. Thereafter, salting out of the reaction mixture gave an anthraquinone compound of the following formula (free acid form).

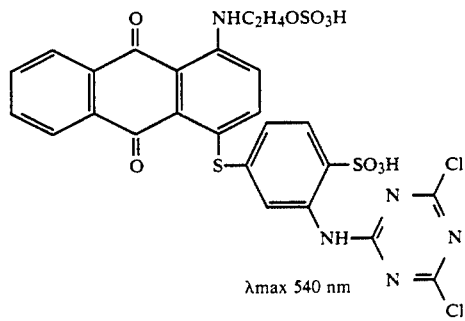

λmax 540 nm

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness and the like, with high exhaustion and fixation percentages and superior build up property.

EXAMPLE 18

Example 17 was repeated, provided that the compounds described in 1st and 2nd columns of the following table were used in place of the 1-(2'-sulfatoethylamino)-4-(3'-amino-4'-sulfophenylthio)anthraquinone and cyanuric chloride, respectively, thereby obtaining a corresponding anthraquinone compound. The compound gave a dyed product of cotton in a color shade described in a 3rd column of the table and exhibited superior dye performances as described hereinabove.

TABLE

| Run No. | 1st | 2nd | 3rd |
|---|---|---|---|
| 1 | [anthraquinone with NH₂, COOH, and S-phenyl(SO₃H)(NH₂) substituents] | cyanuric chloride | Bluish red |
| 2 | " | [chloro/SO₂CH₃ triazine-like structure with CH₃] | " |
| 3 | " | [fluoro/chloro triazine structure] | " |
| 4 | [anthraquinone with NHCH₂(CH₃)₂, COOH, and S-phenyl(SO₃H)(NH₂) substituents] | [fluoro/chloro triazine with CH₃] | " |
| 5 | [anthraquinone with NHCH₂(CH₃)₂, COOH, and S-phenyl(SO₃H)(NH₂) substituents] | [tetrachloro pyrimidine structure] | Bluish red |

TABLE-continued

| Run No. | 1st | 2nd | 3rd |
|---|---|---|---|
| 6 | [anthraquinone structure with NH₂, Br, and S-phenyl(NH₂)(SO₃H) substituents] | [dichloro-cyano-chloro pyrimidine-type structure] | " |
| 7 | [anthraquinone with SO₂H, NH-cyclohexyl, and S-phenyl(SO₃H)(NH₂) substituents] | cyanuric chloride (2,4,6-trichloro-1,3,5-triazine) | " |
| 8 | [anthraquinone with NHC₂H₄SO₃H, CH₃, and S-phenyl(SO₃H)(NH₂) substituents] | cyanuric chloride | Bluish red |
| 9 | [anthraquinone with NH₂, COOH, and S-phenyl(SO₃H)(NH₂) substituents] | [fluoro-chloro-fluoro pyrimidine structure] | Yellowish red |
| 10 | [anthraquinone with NHC₂H₄OCH₃ and S-phenyl(NH₂)(SO₃H)₂ substituents] | " | " |

EXAMPLE 19

1-Amino-2-carboxy-4-bromoanthraquinone (6.9 parts) and 4-(4'-β-hydroxyethylsulfonylphenoxy)thiophenol (6.5 parts) were allowed to react with each other at 100° to 120° C. in 0-dichlorobenzene in the presence of cuprous chloride and potassium carbonate. Thereafter, methanol was added to the reaction mixture to deposit solids, which were collected on a filter, washed throughly with methanol and water and then dried at 80° C. The resulting product was subjected to sulfonation and esterification simultaneously at 20° to 40° C. in 14% oleum. Thereafter, ice was added thereto, the solids deposited were collected on a filter, thereby obtaining an anthraquinone compound of the following formula (free acid form).

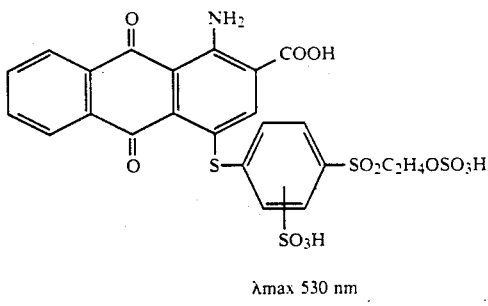

λmax 530 nm and the like with high exhaustion and fixation percentages and superior build-up property.

EXAMPLE 20

Example 19 was repeated, provided that the compounds shown in 1st and 2nd columns of the following table were used in place of the 1-amino-2-carboxy-4-bromoanthraquinone and 4-(4'-β-hydroxyethylsulfonylphenoxy)thiophenol, respectively, thereby obtaining a corresponding anthraquinone compound. A color shade obtained by dyeing cotton with the compound is as shown in a 3rd column of the table.

TABLE

| Run No. | 1st | 2nd | 3rd |
|---|---|---|---|
| 1 | (anthraquinone-NH-cyclohexyl, Br) | HS-C6H4-O-C6H4-SO2C2H4OH | Bluish red |
| 2 | (anthraquinone-NHCH(CH3)2, COOH, Br) | HS-C6H4-NH-C6H4-SO2C2H4OH | " |
| 3 | (anthraquinone-NHC2H4OH, Br) | HS-C6H4-NHCO-C6H4-SO2C2H4OH | " |
| 4 | (anthraquinone-NH-phenyl, Cl) | HS-C6H4-C2H4SO2C2H4OH | " |
| 5 | (anthraquinone-NH-phenyl, Cl) | HS-C6H4-O-C6H4-SO2C2H4OH | " |

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness

EXAMPLE 21

1-Amino-2-carboxy-4-(3'-amino-4'-sulfophenylthio)anthraquinone (9.4 parts) and cyanuric chloride (3.7 parts) were subjected to condensation reaction in an aqueous medium in a usual manner, followed by condensation reaction with 3-aminobenzenesulfonic acid (3.5 parts) at 20° to 40° C. under a weak acid condition, thereby obtaining an anthraquinone compound of the following formula (free acid form).

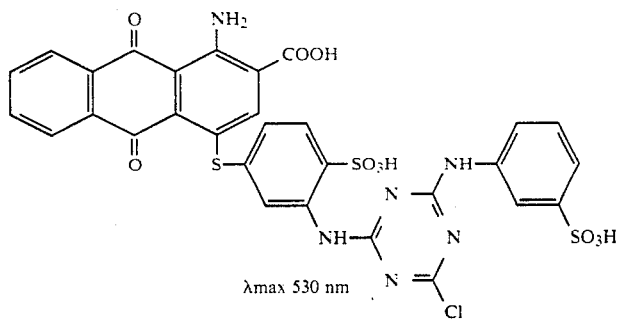

λmax 530 nm

The anthraquinone compound can be used for dyeing cellulose fiber materials, particularly those such as cotton, in the manner described above, for example, by the exhaustion method, to give a dyed product of a bluish red color excellent in fastness properties such as light fastness, perspiration-light fastness, perspiration fastness and the like with high exhaustion and fixation percentages and superior build-up property.

EXAMPLE 22

Example 21 was repeated, provided that the compounds shown in 1st, 2nd and 3rd columns of the following table were used in place of 1-amino-2-carboxy-4-(3'-amino-4'-sulfophenylthio)anthraquinone, cyanuric chloride and 3-aminobenzenesulfonic acid, respectively, thereby obtaining a corresponding anthraquinone compound A color shade on cotton of the compound is as shown in a 4th column of the table.

TABLE

| Run No. | 1st | 2nd | 3rd | 4th |
|---------|-----|-----|-----|-----|
| 1 | anthraquinone with NHCH(CH₃)₂, COOH, S-phenyl(SO₃H, NH₂) substituents | cyanuric chloride (2,4,6-trichloro-1,3,5-triazine) | 2,4-diaminobenzenesulfonic acid type (H₂N-C₆H₃(SO₃H)₂) | Bluish red |
| 2 | " | " | 4-aminobenzenesulfonic acid (H₂N-C₆H₄-SO₃H) | " |
| 3 | anthraquinone with NH-cyclohexyl, SO₃H, S-phenyl(SO₃H, NH₂) substituents | " | aniline (H₂N-C₆H₅) | " |
| 4 | anthraquinone with NHC₂H₄OSO₃H, S-phenyl(SO₃H, NH₂) substituents | " | H₂N—C₂H₄SO₃H | " |

TABLE-continued

| Run No. | 1st | 2nd | 3rd | 4th |
|---|---|---|---|---|
| 5 | Anthraquinone with NHC₂H₅, COOH, Br, S-phenyl(SO₃H)(NH₂) substituents | Triazine with F substituents | H₂N—C₂H₄OH | Bluish red |
| 6 | Anthraquinone with NHC₂H₅, Br, S-phenyl–NHCO–phenyl(SO₃H)(NH₂) substituents | Triazine with Cl substituents | Aniline with C₂H₅ (N-ethylaniline) | " |
| 7 | Anthraquinone with NHCH(CH₃)₂, Cl, NH₂, S-phenyl(SO₃H)(NH₂) substituents | | m-toluidine (H₂N–C₆H₄–CH₃) | " |
| 8 | " | " | p-chloroaniline (H₂N–C₆H₄–Cl) | " |
| 9 | Anthraquinone with NH(CH₂)₃CH₃, SC₂H₄NH₂, SO₃H substituents | Triazine with Cl substituents | 2-amino-6-sulfonaphthalene | Bluish red |

TABLE-continued

| Run No. | 1st | 2nd | 3rd | 4th |
|---|---|---|---|---|
| 10 | [anthraquinone structure with NH-phenyl-SO₃H, S-phenyl(CH₃)(NH₂), and SO₃H substituents] | " | H₂NCH₃ | " |
| 11 | [anthraquinone structure with NH₂, COOH, S-phenyl(SO₃H)(NH₂)] | " | 4-H₂N-C₆H₄-CONHC₂H₄SO₂C₂H₄Cl | Yellowish red |
| 12 | [anthraquinone structure with NH₂, COOH, O-phenyl(SO₃H)(NH₂)] | [trifluorotriazine structure] | [2,4-disulfo aniline structure] | Yellowish red |
| 13 | [anthraquinone structure with NH-cyclohexyl, O-phenyl(SO₃H)(NH₂)(SO₃H)] | | | |

TABLE-continued

| Run No. | 1st | 2nd | 3rd | 4th |
|---|---|---|---|---|
| 14 | anthraquinone with NHCH(CH₃)₂, SO₃H, and aryloxy(SO₃H)-phenoxy(SO₃H, NH₂) substituents | cyanuric chloride | HN(C₂H₅)₂ | " |
| 15 | anthraquinone with NH-phenyl(SO₃H), OC₂H₄NH₂, and SO₃H substituents | " | 2-amino-1,4-benzenedisulfonic acid (H₂N, SO₃H, SO₃H on benzene) | " |

EXAMPLE 23

1-Amino-4-(3'-amino-2',4',6'-trimethyl-5'-sulfophenylthio)anthraquinone-2-sulfonic acid (23.7 parts) and cyanuric chloride (9.3 parts) were subjected to condensation reaction at 10° to 20° C. in an aqueous medium under weak acid condition, followed by condensation reaction with 1-aminobenzene-3-β-sulfatoethylsulfone (14.1 parts) at 20° to 30° C. under a weak acid condition. Thereafter, salting out of the reaction mixture gave an anthraquinone compound of the following formula (free acid form).

bluish red color excellent in fastness properties such as light fastness, perspiration-light fastness, perspiration fastness and the like, with high exhaustion and fixation percentages and superior build-up property.

EXAMPLE 24

Example 23 was repeated, provided that the compounds shown in 1st, 2nd and 3rd columns of the following table were used in place of the 1-amino-4-(3'-amino-2',4',6'-trimethyl-5'-sulfophenylthio)anthraquinone-2-sulfonic acid, cyanuric chloride and 1-aminobenzene-3-β-sulfatoethylsulfone, respectively thereby

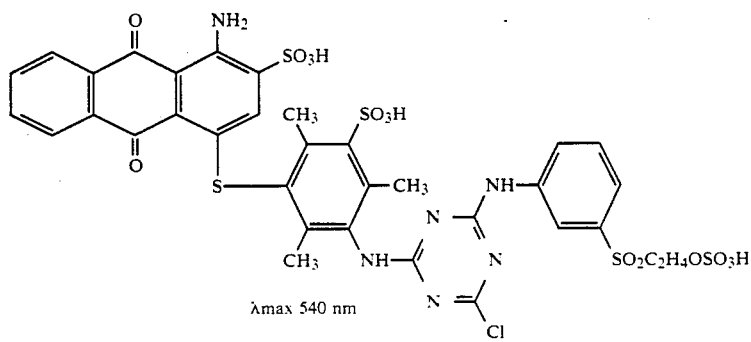

λmax 540 nm

The anthraquinone compound can be used for dyeing cellulose fiber materials, particularly those such as cotton, in the manner described hereinabove, for example, by the exhaustion method, to give a dyed product of a obtaining a corresponding anthraquinone compound. A color shade on cotton of the compound is as shown in a 4th column of the table.

TABLE

| Run No. | 1st | 2nd | 3rd | 4th |
|---|---|---|---|---|
| 1 | 1-amino-4-(3'-amino-2',4',6'-trimethyl-5'-sulfophenylthio)anthraquinone-2-sulfonic acid | cyanuric chloride (2,4,6-trichloro-1,3,5-triazine) | H₂N—⟨⟩—SO₂C₂H₄OSO₃H | Bluish red |
| 2 | " | " | 3-(N-ethylamino)phenyl-β-sulfatoethylsulfone | " |
| 3 | 1-amino-4-(3-amino-4-sulfophenylthio)anthraquinone-2-sulfonic acid | " | 2-methoxy-5-(β-sulfatoethylsulfonyl)aniline | " |
| 4 | " | " | H₂N—⟨⟩—SO₂C₂H₄OSO₃H | " |
| 5 | 1-amino-4-(3-amino-4-sulfophenylthio)anthraquinone-2-sulfonic acid | cyanuric fluoride (2,4,6-trifluoro-1,3,5-triazine) | H₂N—⟨⟩—SO₂C₂H₄OSO₃H | Bluish red |

TABLE-continued

| Run No. | 1st | 2nd | 3rd | 4th |
|---|---|---|---|---|
| 6 | 1-amino-4-(4-amino-2,5-disulfophenylthio)anthraquinone-2-sulfonic acid | cyanuric chloride | 3-aminophenyl vinyl sulfone (H₂N-C₆H₄-SO₂CH=CH₂) | " |
| 7 | " | " | N-ethyl-4-amino-(β-sulfatoethylsulfonyl)aniline (C₂H₅NH-C₆H₄-SO₂C₂H₄OSO₃H) | " |
| 8 | 1-amino-4-(4-amino-2-methyl-5-sulfophenylthio)anthraquinone-2-sulfonic acid | " | 4-amino-3-methylphenyl β-sulfatoethyl sulfone (H₂N-C₆H₃(CH₃)-SO₂C₂H₄OSH₃H) | " |
| 9 | 1-amino-4-(4-aminomethyl-3-sulfophenylthio)anthraquinone-2-sulfonic acid | cyanuric chloride | 2-methoxy-4-(β-sulfatoethylsulfonyl)aniline (H₂N-C₆H₃(OCH₃)-SO₂C₂H₄OSO₃H) | Bluish red |
| 10 | 1-amino-4-(4-aminomethyl-2-sulfophenylthio)anthraquinone-2-sulfonic acid | cyanuric chloride | 2,5-dimethoxy-4-(β-sulfatoethylsulfonyl)aniline | Bluish red |
| 11 | 1-amino-4-(3-aminomethyl-4-methoxy-2-sulfophenylthio)anthraquinone-2-sulfonic acid | cyanuric chloride | 3-amino-(β-sulfatoethylsulfonyl)benzene (H₂N-C₆H₄-SO₂C₂H₄OSO₃H) | " |
| 12 | 1-amino-4-(4-aminomethyl-3,6-disulfophenylthio)anthraquinone-2-sulfonic acid | " | " | " |
| 13 | 1-amino-4-(2-(3-amino-4-sulfophenyl)ethylthio)anthraquinone-2-sulfonic acid | cyanuric chloride | 4-amino-3-sulfo-(β-sulfatoethylsulfonyl)benzene | Bluish red |
| 14 | 1-amino-4-(4-(N-methylaminomethyl)-3,6-disulfophenylthio)anthraquinone-2-sulfonic acid | " | 4-amino-(β-sulfatoethylsulfonyl)benzene (H₂N-C₆H₄-SO₂C₂H₄OSO₃H) | " |

TABLE-continued

| Run No. | 1st | 2nd | 3rd | 4th |
|---|---|---|---|---|
| 15 | 1-amino-4-(2-(3,5-disulfo-4-aminophenylthio)ethoxy)-anthraquinone-2-sulfonic acid | " | 4-amino-2-ethoxyphenyl-β-sulfatoethylsulfone | " |
| 16 | 1-amino-4-(4-amino-3-sulfophenylthio)anthraquinone-2-sulfonic acid | cyanuric chloride | 2-amino-6-(β-sulfatoethylsulfonyl)naphthalene-1-sulfonic acid | Bluish red |
| 17 | " | " | 7-amino-1-(β-sulfatoethylsulfonyl)naphthalene-3-sulfonic acid | " |
| 18 | 1-amino-4-(3-amino-4-sulfophenylthio)anthraquinone-2-sulfonic acid | " | 7-amino-3-(β-sulfatoethylsulfonyl)naphthalene-1-sulfonic acid | " |
| 19 | " | " | 2-amino-6-(β-sulfatoethylsulfonyl)naphthalene | " |
| 20 | 1-amino-4-(4-sulfo-3-aminophenylthio)anthraquinone-2-sulfonic acid | cyanuric chloride | N-(2-hydroxyethyl)-3-(β-sulfatoethylsulfonyl)aniline | Bluish red |
| 21 | 1-methylamino-4-(4-amino-3-sulfophenylthio)anthraquinone-2-sulfonic acid | " | 3-amino-(β-sulfatoethylsulfonyl)benzene | " |
| 22 | 1-acetamido-4-(4-amino-3-sulfophenylthio)anthraquinone-2-sulfonic acid | " | N-methyl-3-(β-sulfatoethylsulfonyl)aniline | Red |
| 23 | 1-acetamido-4-(4-sulfo-3-aminophenylthio)anthraquinone-2-sulfonic acid | cyanuric chloride | N-methyl-3-(β-sulfatoethylsulfonyl)aniline | Red |

TABLE-continued

| Run No. | 1st | 2nd | 3rd | 4th |
|---|---|---|---|---|
| 24 | 1-(4-sulfophenylamino)-2-sulfo-4-(3-amino-4-sulfophenylthio)anthraquinone | " | H₂N–C₆H₄–SO₂CH₂CH₂Cl (para) | " |
| 25 | 1-benzamido-2-sulfo-4-(4-amino-3-sulfophenylthio)anthraquinone (NHCO-phenyl) | " | 2-chloro-4-(SO₂C₂H₄OSO₃H)aniline | " |
| 26 | 1-ethylamino-2-sulfo-4-(4-amino-3-sulfophenylthio)anthraquinone | cyanuric chloride (2,4,6-trichloro-1,3,5-triazine) | 3-(SO₂C₂H₄OSO₃H)-N-phenylamine | Bluish red |
| 27 | 1-(n-propylamino)-2-sulfo-4-(3-amino-4-sulfophenylthio)anthraquinone | " | N-(n-propyl)-3-(SO₂C₂H₄OSO₃H)aniline | " |
| 28 | 1-(isopropylamino)-2-sulfo-4-(3-amino-4-sulfophenylthio)anthraquinone | " | 2-methoxy-4-(SO₂C₂H₄OSO₃H)-5-methylaniline | " |
| 29 | 1-(2-methoxyethylamino)-2-sulfo-4-(4-amino-3-sulfophenylthio)anthraquinone | cyanuric chloride | 4-ethylaniline (H₂N–C₆H₄–C₂H₅) | Bluish red |
| 30 | 1-(2-carboxyethylamino)-2-sulfo-4-(3-amino-4-sulfophenylthio)anthraquinone | " | H₂N–C₆H₄–SO₂CH=CH₂ | " |
| 31 | 1-(2-sulfatoethylamino)-2-sulfo-4-(3-amino-4-sulfophenylthio)anthraquinone | " | H₂N–C₆H₄–SO₂C₂H₄OSO₃H | " |

TABLE-continued

| Run No. | 1st | 2nd | 3rd | 4th |
|---|---|---|---|---|
| 32 | 1-(cyclohexylamino)-2-sulfo-4-(4-amino-3-sulfophenylthio)anthraquinone | cyanuric chloride | H₂N–C₆H₄–SO₂C₂H₄OSO₃H (para) | Red |
| 33 | 1-amino-2-sulfo-4-(4-aminocyclohexylthio)anthraquinone | " | " | Bluish red |
| 34 | 1-amino-2,7-disulfo-4-(3-aminocyclohexylthio)anthraquinone | " | H₂N–C₆H₄–SO₂C₂H₄OSO₃H (meta) | " |
| 35 | 1-amino-2,6-disulfo-4-(4-aminocyclohexylthio)anthraquinone | " | " | " |
| 36 | 1-amino-2,5,8-trisulfo-4-(4-methyl-3-aminocyclohexylthio)anthraquinone | cyanuric chloride | H₂N–C₆H₄–SO₂C₂H₄OSO₃H (meta) | Bluish red |
| 37 | 1-amino-2,7-disulfo-4-(3-amino-5,5-dimethylcyclohexylthio)anthraquinone | " | " | " |
| 38 | 1-amino-2-sulfo-4-(2-aminoethylthio)anthraquinone | cyanuric chloride | " | " |
| 39 | 1-amino-2,7-disulfo-4-(3-aminopropylthio)anthraquinone | " | " | " |
| 40 | 1-amino-2,6-disulfo-4-(4-aminobutylthio)anthraquinone | cyanuric chloride | H₂N–C₆H₄–SO₂C₂H₄OSO₃H (meta) | Bluish red |

| Run No. | 1st | 2nd | 3rd | 4th |
|---|---|---|---|---|
| 41 | (anthraquinone structure with NH₂, SO₃H, SO₃H, S-biphenyl-NH₂, SO₃H) | " | " | " |
| 42 | (anthraquinone structure with NH₂, SO₃H, S-biphenyl-NH₂, SO₃H) | " | C₂H₅NH-phenyl-SO₂C₂H₄OSO₃H | " |
| 43 | (anthraquinone structure with NH₂, SO₃H, S-phenyl(SO₃H)-NH-phenyl(SO₃H)-NH₂) | " | " | " |
| 44 | (anthraquinone structure with NH₂, SO₃H, S-phenyl(SO₃H)-NH-phenyl(SO₃H)-NH₂) | " | H₂N-phenyl-SO₂C₂H₄OSO₃H | Bluish red |
| 45 | (anthraquinone structure with NH₂, SO₃H, S-phenyl(SO₃H)-O-phenyl(SO₃H)-NH₂) | " | " | " |

EXAMPLE 25

1-Amino-4-(3'-amino-2',4',6'-trimethyl-5'-sulfophenylthio)anthraquinone-2-sulfonic acid (23.7 cyanuric chloride (9.3 parts) and 1-aminobenzene-3-β-sulfatoethylsulfone (14.1 parts) were subjected to condensation reactions one after another in an aqueous medium in a usual manner, followed by further condensation reaction with 3-aminobenzenesulfonic acid (8.7 parts) at 50° to 60° C. under a weak acid condition. Thereafter, salting out of the reaction mixture gave an anthraquinone compound of the following formula (free acid form).

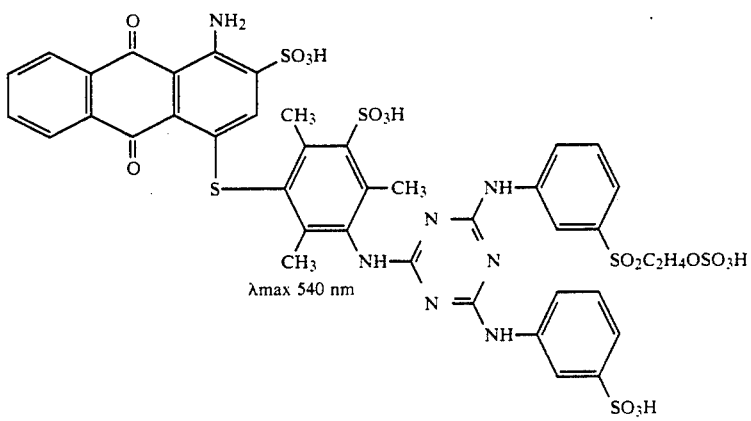

λmax 540 nm

The anthraquinone compound can be used for dyeing cellulose fiber materials, particularly those such as cotton, in the manner described hereinabove, for example, by the exhaustion method, to give a dyed product of a bluish red color excellent in fastness properties such as light fastness, perspiration-light fastness, perspiration fastness and the like with high exhaustion and fixation percentages and superior build-up property.

EXAMPLE 26

Example 25 was repeated, provided that the compounds shown in 1st, 2nd and 3rd columns of the following table were used in place of 1-amino-4-(3'-amino-2',4',6'-trimethyl-5'-sulfophenylthio)anthraquinone-2-sulfonic acid, 1-aminobenzene-3-β-sulfatoethylsulfone and 3-aminobenzenesulfonic acid, respectively, thereby obtaining a corresponding anthraquinone compound A color shade on cotton of the compound is as shown in a 4th column of the table.

TABLE

| Run No. | 1st | 2nd | 3rd | 4th |
|---|---|---|---|---|
| 1 | 1-amino-4-(3-amino-4-sulfophenylthio)anthraquinone-2-sulfonic acid | H₂N—C₆H₄—SO₂C₂H₄OSO₃H (meta) | H₂N—C₆H₄—SO₃H | Bluish red |
| 2 | " | HN(C₂H₅)—C₆H₅ | H₂N—C₆H₄—SO₂C₂H₄OSO₃H | Bluish red |
| 3 | " | HN(C₂H₅)—C₆H₄—Cl | " | Bluish red |
| 4 | " | H₂N—C₆H₄—SO₂C₂H₄OSO₃H | H₂N—C₆H₅ | Bluish red |
| 5 | 1-amino-4-(3-amino-4-sulfophenylthio)anthraquinone-2-sulfonic acid | H₂N—C₆H₄—SO₂C₂H₄OSO₃H | H₂N—C₆H₄—OCH₃ | Bluish red |
| 6 | 1-amino-4-(3-amino-4-sulfophenylthio)anthraquinone-2-sulfonic acid | H₂N—C₆H₄—SO₂C₂H₄OSO₃H | H₂N—C₆H₄—SO₃H | Bluish red |
| 7 | " | " | H₂N—C₆H₄—Cl | Bluish red |
| 8 | " | " | H₂NC₂H₅ | Bluish red |
| 9 | 1-amino-4-(3-amino-4-sulfophenylthio)anthraquinone-2-sulfonic acid | H₂N—C₆H₄—SO₂C₂H₄OSO₃H | H₂N—C₆H₄—CH₃ | Bluish red |
| 10 | " | " | H₂N—C₆H₄—COOH | Bluish red |

TABLE-continued

| Run No. | 1st | 2nd | 3rd | 4th |
|---|---|---|---|---|
| 11 | 1-amino-2-sulfo-4-[(3-amino-4-sulfophenyl)thio]anthraquinone | $H_2N$—C$_6$H$_4$—SO$_2$C$_2$H$_4$OSO$_3$H | $H_2N$—C$_6$H$_4$(m-SO$_2$C$_2$H$_4$OSO$_3$H) | Bluish red |
| 12 | " | " | $H_2N$—C$_6$H$_4$—SO$_2$C$_2$H$_4$OSO$_3$H | Bluish red |
| 13 | 1-amino-2-sulfo-4-[(3-amino-4-sulfophenyl)thio]anthraquinone | C$_2$H$_5$NH—C$_6$H$_4$—SO$_2$C$_2$H$_4$OSO$_3$H | $H_2N$—C$_6$H$_4$(m-SO$_2$C$_2$H$_4$OSO$_3$H) | Bluish red |
| 14 | 1-amino-2-sulfo-4-[(4-amino-2,3,5-trimethyl-6-sulfophenyl)thio]anthraquinone | C$_2$H$_5$NH—C$_6$H$_4$—SO$_2$C$_2$H$_4$OSO$_3$H | $H_2N$—C$_6$H$_3$(OCH$_3$)(SO$_2$C$_2$H$_4$OSO$_3$H) | Bluish red |
| 15 | " | $H_2N$—C$_6$H$_3$(OCH$_3$)(CH$_3$)—SO$_2$C$_2$H$_4$OSO$_3$H | $H_2N$—C$_6$H$_4$(m-SO$_2$C$_2$H$_4$OSO$_3$H) | Bluish red |
| 16 | 1-amino-2-sulfo-4-[(3-amino-4-sulfophenyl)thio]anthraquinone | CH$_3$NH—C$_6$H$_5$ | " | Bluish red |
| 17 | 1-amino-2-sulfo-4-[(3-amino-4-sulfophenyl)thio]anthraquinone | 2-Cl-C$_6$H$_4$—NH— | $H_2N$—C$_6$H$_4$(m-SO$_2$C$_2$H$_4$OSO$_3$H) | Bluish red |
| 18 | 1-(NH)-2-sulfo-4-(SC$_2$H$_4$NH$_2$)-6-sulfoanthraquinone | C$_2$H$_5$NH—C$_6$H$_5$ | " | Bluish red |
| 19 | 1-amino-2-sulfo-4-[(4-aminocyclohexyl)thio]anthraquinone | $H_2N$—C$_6$H$_4$—SO$_2$C$_2$H$_4$OSO$_3$H | $H_2N$—C$_6$H$_3$(SO$_3$H)$_2$ | Bluish red |

TABLE-continued

| Run No. | 1st | 2nd | 3rd | 4th |
|---|---|---|---|---|
| 20 | 1-amino-2-sulfo-4-(4-sulfo-3-aminomethylphenylthio)anthraquinone | " | " | Bluish red |
| 21 | 1-amino-2-sulfo-4-(4'-amino-2,3'-disulfobiphenyl-4-ylthio)anthraquinone | H₂N—C₆H₄—SO₂C₂H₄OSO₃H | H₂N—C₂H₄OH | Bluish red |
| 22 | 1-amino-2-sulfo-4-(4-sulfo-3-aminophenylthio)anthraquinone | " | H₂N—C₂H₄SO₃H | Bluish red |
| 23 | " | H₂N—C₆H₄—SO₂C₂H₄OSO₃H | HN(C₂H₅)₂ | Bluish red |
| 24 | 1-amino-2-sulfo-4-[4-(4-amino-3-sulfoanilino)-3-sulfophenylthio]anthraquinone | " | HN(C₂H₄OH)₂ | Bluish red |
| 25 | 1-amino-2-sulfo-4-[4-(4-aminobenzoylamino)-3-sulfophenylthio]anthraquinone | " | HN(C₂H₄OCH₃)(C₂H₅) | Bluish red |
| 26 | 1-amino-2-sulfo-4-(4-sulfo-3-aminophenylthio)anthraquinone | H₂N—C₆H₄—SO₂C₂H₄OSO₃H | H₂NCH₂—C₆H₅ | Bluish red |
| 27 | " | " | H₂N—naphthyl—SH₃H | Bluish red |
| 28 | " | " | H₂N—(CH₂)₂CH₃ | Bluish red |
| 29 | 1-amino-2-sulfo-4-(4-sulfo-3-aminophenylthio)anthraquinone | 2-amino-1,4-disulfobenzene | H₂N—C₆H₄—SO₂CH₂CH₂Cl | Bluish red |

TABLE-continued

| Run No. | 1st | 2nd | 3rd | 4th |
|---|---|---|---|---|
| 30 | " | 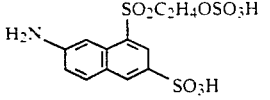 | 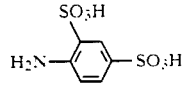 | Bluish red |

EXAMPLE 27

1-Amino-4-(3'-amino-2',4',6'-trimethyl-5'-sulfophenylthio)anthraquinone-2-sulfonic acid (23.7 parts), cyanuric chloride (9.3 parts) and 1-aminobenzene-3-β-sulfatoethylsulfone (14.1 parts) were subjected to condensation reactions one after another in an aqueous medium in a usual manner, followed by condensation reaction with pyridine (4.5 parts) at 60° to 70° C. under a weak acid condition. Thereafter, salting out of the reaction mixture gave an anthraquinone compound of the following formula (free acid form).

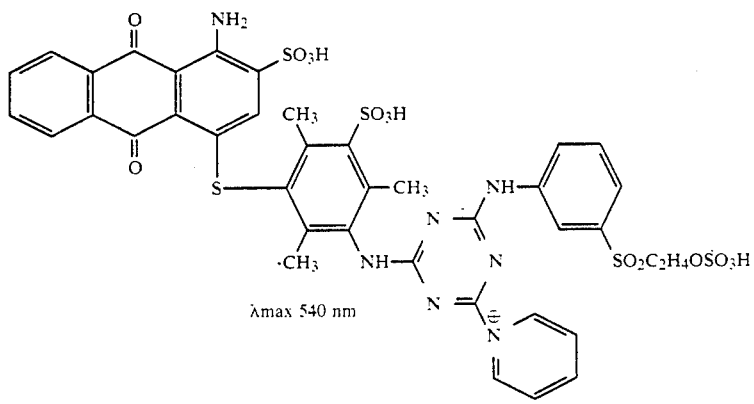

λmax 540 nm

The anthraquinone compound can be used for dyeing cellulose fiber materials, particularly those such as cotton, in the manner described hereinabove, for example, by the exhaustion method, to give a dyed product of a bluish red color excellent in fastness properties such as light fastness, perspiration-light fastness, perspiration fastness and the like with high exhaustion and fixation percentages and superior build-up property.

EXAMPLE 28

Example 27 was repeated, provided that the compounds shown in 1st, 2nd and 3rd columns of the following table were used in place of the 1-amino-4-(3'-amino-2',4', 6'-trimethyl-5'-sulfophenylthio)anthraquinone-2-sulfonic acid, 1-aminobenzene-3-β-sulfatoethylsulfone and pyridine, respectively, thereby obtaining a corresponding anthraquinone compound. A color shade on cotton of the compound is as shown in a 4th column of the table.

TABLE

| Run No. | 1st | 2nd | 3rd | 4th |
|---|---|---|---|---|
| 1 | anthraquinone structure with NH₂, SO₃H, and thioether-linked aminobenzenesulfonic acid | 3-H₂N-C₆H₄-SO₂C₂H₄OSO₃H | 3-pyridyl-COOH | Bluish red |
| 2 | " | " | 4-pyridyl-COOH | " |
| 3 | " | " | 3-pyridyl-SO₃H | " |
| 4 | " | " | 2-pyridyl-C₂H₄OH | " |
| 5 | anthraquinone structure with NH₂, SO₃H, and thioether-linked aminobenzenesulfonic acid | 4-H₂N-C₆H₄-SO₂C₂H₄OSO₃H | 3-pyridyl-CONH₂ | Bluish red |

TABLE-continued

| Run No. | 1st | 2nd | 3rd | 4th |
|---|---|---|---|---|
| 6 | " | ![structure: aminobenzene with SO2C2H4OSO3H meta] | N(CH3)3 | " |
| 7 | " | " | N(C2H5)3 | " |
| 8 | | | CH3–N(CH3)–C2H4OSO3H | |
| 9 | ![anthraquinone structure with NH2, SO3H, S-linked trimethyl-SO3H-amino-phenyl] | ![structure: aminobenzene with SO2C2H4OSO3H meta] | CH3–N(CH3)–C3H7 n | Bluish red |
| 10 | ![anthraquinone structure with NH2, SO3H, S-linked SO3H-amino-phenyl] | ![structure: Cl, H2N, SO2C2H4OSO3H substituted benzene] | N(CH3)3 | " |

TABLE-continued

| Run No. | 1st | 2nd | 3rd | 4th |
|---|---|---|---|---|
| 11 | anthraquinone with NH2, SO3H, and O-linked aminobenzenesulfonate groups | 3-aminophenyl-SO2C2H4OSO3H | 3-pyridyl-COOH | Yellowish red |
| 12 | anthraquinone with NH2, SO3H, and O-linked aminobenzenesulfonate groups | | 3-pyridyl-CN | |
| 13 | tetracenequinone with NH2, SO3H, and cyclohexylamino-O groups | 4-aminophenyl-SO2C2H4OSO3H | pyridine | Yellowish red |
| 14 | anthraquinone with NH2, SO3H, and OC2H4NH2 groups | 3-(N-ethylamino)phenyl-SO2C2H4OSO3H | N(C2H4OH)3 | |

| Run No. | 1st | 2nd | 3rd | 4th |
|---|---|---|---|---|
| 15 | anthraquinone with NH₂, SO₃H, OC₂H₄O-phenyl-NH₂,SO₃H substituents | H₂N-naphthalene-SO₃H, SO₂C₂H₄OSO₃H | N(C₂H₅)₃ | " |

DYEING EXAMPLE 1

Each anthraquinone compound obtained in Examples 1, 13 and 23 (each 0.1, 0.3 and 0.6 part) was respectively dissolved in water (200 parts), and sodium sulfate (20 parts) and cotton (10 parts) were added thereto. The bath was heated to 60° C., and 30 minutes thereafter sodium carbonate (3 parts) was added thereto. Dyeing was continued for 1 hour at that temperature. Thereafter, the cotton taken out was washed with water and soaped to obtain each dyed product of a bluish red color excellent in fastness properties, particularly those such as light fastness and perspiration-light fastness, with superior build-up property.

Each compound was found to be superior in solubility level-dyeing property and reproducibility.

DYEING EXAMPLE 2

The anthraquinone compound obtained in Example 5 (0.3 part) was dissolved in water (200 parts), and sodium sulfate (20 parts) and cotton (10 parts) were added thereto. The bath was heated to 40° C., and 20 minutes thereafter, trisodium phosphate (3 parts) was added thereto. Dyeing was continued for 1 hour at that temperature. Then, the cotton taken out was washed with water and soaped to obtain a dyed product of a bluish red color excellent in fastness properties.

DYEING EXAMPLE 3

Each anthraquinone compound obtained in Example 14 and Run No. 7 of Example 24 (0.3 part) was dissolved in water (200 parts), and sodium sulfate (20 parts) and cotton (10 parts) were added thereto. The bath was heated to 60° C., and 20 minutes thereafter, trisodium phosphate (3 parts) was added thereto. Dyeing was continued for 1 hour at that temperature. Then, the cotton taken out was washed with water and soaped to obtain each dyed product of bluish red color excellent in fastness properties.

DYEING EXAMPLE 4

The anthraquinone compound obtained in Example 3 (each 0.1, 0.3 and 0.6 part) was dissolved in water (200 parts), sodium sulfate (30 parts) and cotton (10 parts) were added thereto. The bath was heated to 50° C., and 30 minutes thereafter sodium carbonate (3 parts) was added thereto. Dyeing was continued for 1 hour at that temperature. Then, the cotton taken out was washed with water and soaped to obtain each dyed product of a bluish red color excellent in fastness properties, particularly those such as light fastness and perspiration-light fastness, with superior build-up property.

The compound was also found to be superior in solubility and reproducibility.

DYEING EXAMPLE 5

Each anthraquinone compound obtained in Examples 15 and 25 (each 0.1, 0.3 and 0.6 part) was dissolved in water (200 parts), and sodium sulfate (30 parts) and cotton (10 parts) were added thereto. The bath was heated to 70° C., and 30 minutes thereafter, sodium carbonate (3 parts) was added thereto. Dyeing was continued for 1 hour at that temperature. The cotton taken out was washed with water and soaped to obtain each dyed product of a bluish red color excellent in fastness properties, particularly those such as hight fastness and perspiration-light fastness, with superior build-up property.

Each compound was also found to have superior solubility and exhibit favorable level-dyeing property and reproducibility.

DYEING EXAMPLE 6

The anthraquinone compound obtained in Example 7 (0.3 part) was dissolved in water (200 parts), and sodium sulfate (30 parts) and cotton (10 parts) were added thereto. The bath was heated to 50° C., and 20 minutes thereafter trisodium phosphate (3 parts) was added thereto. Dyeing was continued for 1 hour at that temperature. Then, the cotton taken out was washed with water and soaped to obtain a dyed product of a bluish red color excellent in fastness properties

DYEING EXAMPLE 7

The anthraquinone compound obtained in Example 17 (0.3 part) was dissolved in water (200 parts), and sodium sulfate (30 parts) and cotton (10 parts) were added thereto. The bath was heated to 40° C., and 20 minutes thereafter, trisodium phosphate (3 parts) was added thereto. Dyeing was continued for 1 hour at that temperature. Then, the cotton taken out was washed with water and soaped to obtain a dyed product of a bluish red color excellent in fastness properties.

DYEING EXAMPLE 8

The anthraquinone compound obtained in Run No. 7 of Example 26 (0.3 part) was dissolved in water (200 Parts), and sodium sulfate (30 parts) and cotton (10 parts) were added thereto. The bath was heated to 70° C., and 20 minutes thereafter, trisodium phosphate (3 parts) was added thereto. Dyeing was continued for 1 hour at that temperature. The cotton taken out was washed with water and soaped to out obtain a dyed product of a bluish red color excellent in fastness properties.

DYEING EXAMPLE 9

| Composition of color paste | |
|---|---|
| Each anthraquinone compound obtained in Examples 11, 13 and 23 | 5 parts |
| Urea | 5 parts |
| Sodium alginate (5%), a thickner | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 100° C. for 5 minutes, washed with hot water, soaped, again washed with hot water and then dried to obtain each product printed in a bluish red color excellent in various fastness properties.

DYEING EXAMPLE 10

| Composition of color paste | |
|---|---|
| Each anthraquinone compound obtained in Examples 9, 19 and 27 | 5 parts |
| Urea | 5 parts |
| Sodium alginate (5%), a thickner | 50 parts |
| Hot water | 25 parts |
| Sodium hydrogencarbonate | 2 parts |
| Balance (water) | 13 parts |

Mercerized cotton broad cloth was printed with the color paste of the above composition, pre-dried, steamed at 110° C. for 5 minutes, when washed with hot water, soaped, again washed with hot water and dried to obtain each printed product of a bluish red color excellent in fastness properties.

What is claimed is:

1. A compound of the formula:

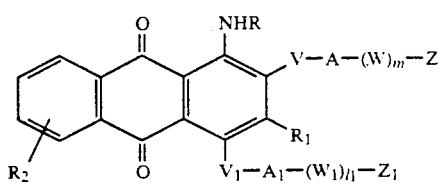

wherein $R_1$ is hydrogen; $R_2$ is hydrogen or sulfo; R is hydrogen, methyl, ethyl, propyl, isopropyl, butyl, isobutyl, carboxymethyl, 2-carboxyethyl, 2-sulfoethyl, 2-methoxyethyl, 2-ethoxyethyl, 2-hydroxyethyl, 2-sulfatoethyl, cyclohexyl, phenyl, 2-, 3- or 4-sulfophenyl, 2-, 3-, or 4-methylphenyl, 2-, 3- or 4-chlorophenyl, 2-, 3-, or 4-methoxyphenyl, 2-, 3-, or 4-carboxyphenyl, acetyl, propionyl, benzoyl, 2-, 3- or 4-sulfonbenzyl, 2-, 3- or 4-carboxybenzoyl, 2-, 3- or 4-chlorobenzoyl, 2-, 3-, or 4-methoxybenzoyl, 2-, 3- or 4methoxybenzoyl, methylsulfonyl, ethylsulfonyl, phenylsulfonyl, 2-, 3-, or 4-methylphenylsulfonyl, 2-, 3-, or 4-chlorophenylsulfonyl, 2-, 3- or 4-sulfophenylsulfonyl, 2-, 3- or 4- carboxyphenylsulfonyl, or 2-, 3- or 4-methoxyphenylsulfonyl; V is divalent group of —O— or —S—; W is the divalent group —$NR_3$— in which $R_3$ is hydrogen or $C_1$-$C_4$ alkyl which is unsubstituted or substituted hydroxy, cyano, $C_1$-$C_4$ alkoxy, chloro, bromo, carboxy, carbamoyl, $C_1$-$C_4$ alkoxycarbonyl, $C_1$-$C_4$ alkylcarbonyloxy, sulfo or sulfamoyl; Z is hydrogen or a fiber-reactive group; $V_1$ is the divalent group —S—; $W_1$ is the divalent group —$NR_5$— in which $R_5$ is hydrogen or $C_1$-$C_4$ alkyl which is unsubstituted or substituted by hydroxy, cyano, $C_1$-$C_4$ alkoxy, chloro, bromo, carboxy, carbamoyl, $C_1$-$C_4$ alkoxycarbonyl, $C_1$-$C_4$ alkylcarbonyloxy, sulfo or sulfamoyl; $l_1$ is 0 or 1; m is 0 or 1; $Z_1$ is hydrogen or a fiber-reactive group; A and $A_1$ independently of one another are each a group of one of the following formulae (9), (10), (11), or (12), the formula (9) being

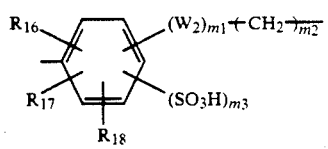

wherein $R_{16}$, $R_{17}$ and $R_{18}$ independently of one another are each hydrogen, methyl, ethyl, methoxy, ethoxy, chloro, bromo or carboxy, $W_2$ is a divalent group selected from the group consisting of —O—, —S—, —$NR_{19}$— and —$NR_{20}CO$— in which $R_{19}$ and $R_{20}$ are each hydrogen, $m_1$ is 0 or 1, $m_2$ is 0, 1, 2, 3 or 4, and $m_3$ is 0, 1, or 2, the formula (10) being

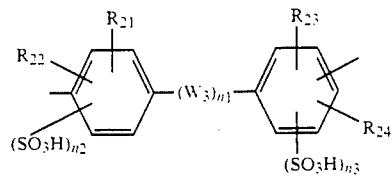

wherein $R_{21}$, $R_{22}$, $R_{23}$ and $R_{24}$ independently of one another are each hydrogen, methyl, ethyl, methoxy, ethoxy, chloro, bromo or carboxy, $W_3$ is a bridging group selected from the group consisting of —O—, —S—, —$NR_{25}$— or —$NR_{26}CO$— in which $R_{25}$ and $R_{26}$ are each hydrogen, $n_1$ is 0 or 1, and $n_2$ and $n_3$ are each 0, 1 or 2, the formula (11) being

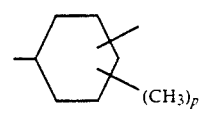

wherein p is 0, 1, 2 or 3, and
the formula (12) being $(CH_2)_q$ wherein q is an integer of 2 to 6, with the proviso that:
at least one of Z and $Z_1$ is a fiber-reactive group;
when Z is hydrogen, m is 0, and when $Z_1$ is hydrogen, $l_1$ is 0; and
at least one of R, A and $A_1$ is a sulfo-containing group;
wherein the fiber-reactive group represented by Z or $Z_1$ is any one of those represented by the following formulae (13) to (17),
the formula (13) being

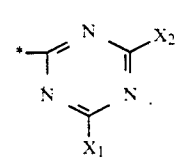

wherein $X_1$ and $X_2$ independently of each other are each chloro, fluoro,

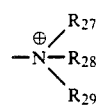

in which $R_{27}$, $R_{28}$ and $R_{29}$ independently of each other are each $C_1$-$C_4$ alkyl,

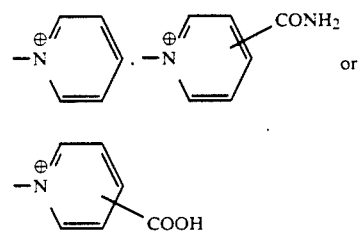

and the asterisked linkage bonds to W or $W_1$,
the formula (14) being

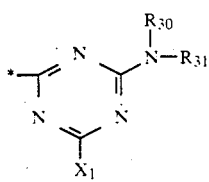 (14)

wherein $R_{30}$ is hydrogen or $C_1$–$C_4$ alkyl, $R_{31}$ is hydrogen or $C_1$–$C_4$ alkyl, phenyl or naphthyl, and $X_1$ and the asterisked linkage are as defined above, the formula (15) being

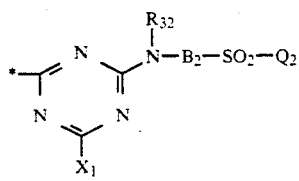 (15)

wherein $R_{32}$ is hydrogen or $C_1$–$C_4$ alkyl, $B_2$ is phenylene which is unsubstituted or substituted once or twice by methyl, ethyl, methoxy, ethoxy, chloro, bromo, sulfo, carboxy or nitro, $Q_2$ is vinyl or —$CH_2CH_2L_2$ in which $L_2$ is a group capable of being split by the action of an alkali; and the asterisked linkage are as defined above; the formula (16) being

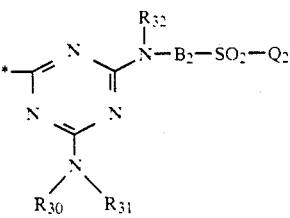 (16)

wherein $R_{30}$, $R_{31}$, $R_{32}$, $B_2$, $Q_2$ and the asterisked linkage are as defined above, and the formula (17) being

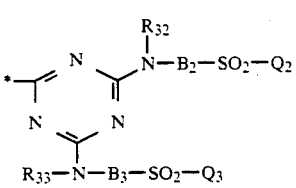 (17)

wherein $R_{33}$ is hydrogen or $C_1$–$C_4$ alkyl, $B_3$ is phenylene which is unsubstituted or substituted once or twice by methyl, ethyl, methoxy, ethoxy, chloro, bromo, sulfo, carboxy or nitro, $Q_3$ is vinyl or —$CH_2CH_2L_3$ in which $L_3$ is a group capable of being split by the action of an alkali; and $R_{32}$, $B_2$, $Q_2$ and the asterisked linkage are as defined above.

2. A compound of the formula:

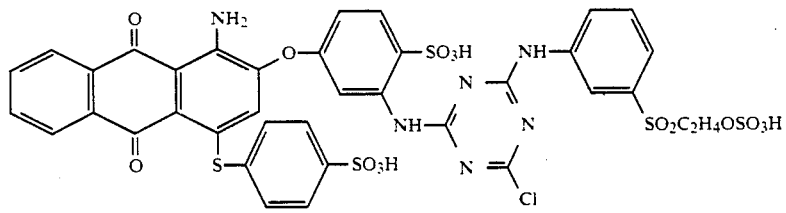

* * * * *